INVENTORS.
ROBERT H. LAWSON,
ISAAC H. C. GREEN,
BY Roy F. Lovell
ATT'Y.

Feb. 14, 1939. R. H. LAWSON ET AL 2,146,750
KNITTING MACHINE
Filed Feb. 3, 1934 15 Sheets-Sheet 3

INVENTORS:
ROBERT H. LAWSON,
ISAAC H. C. GREEN,
By Roy F. Lovell
ATT'Y.

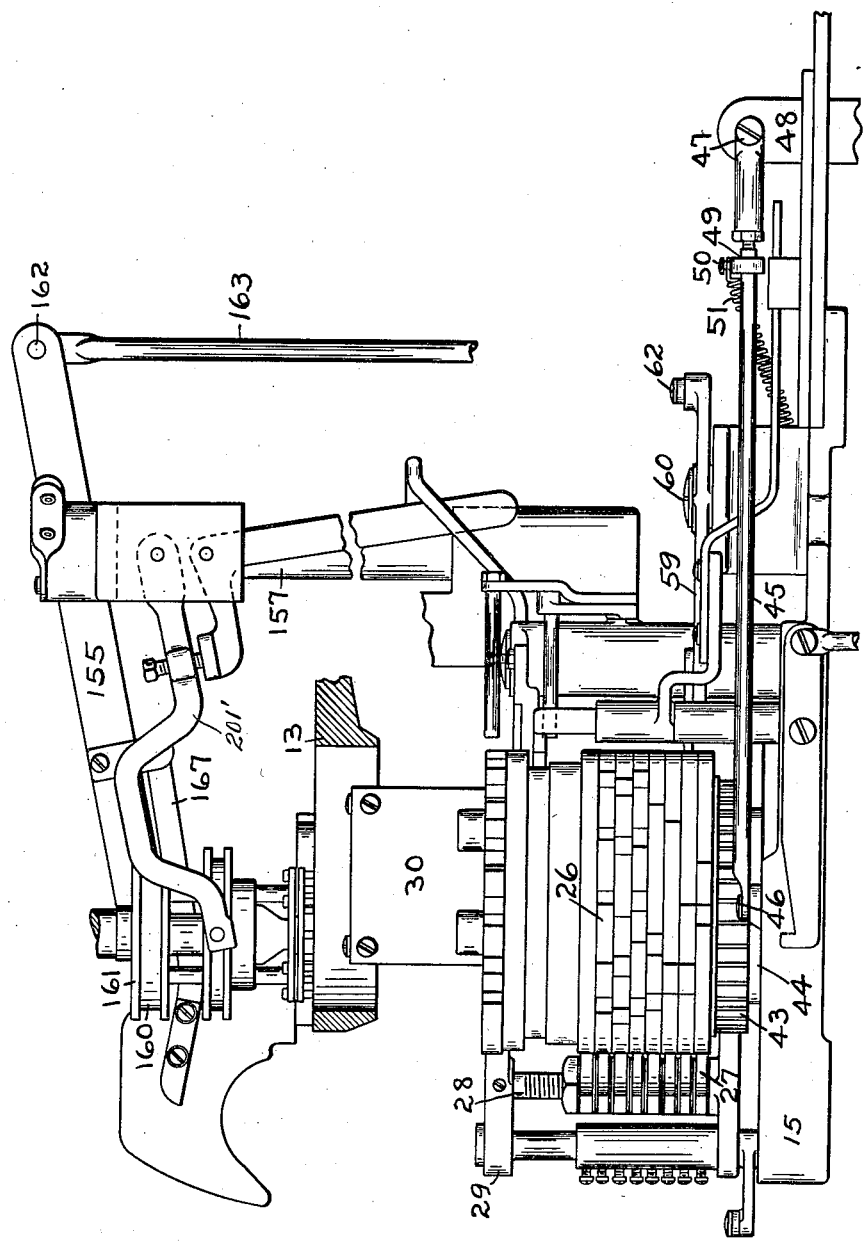

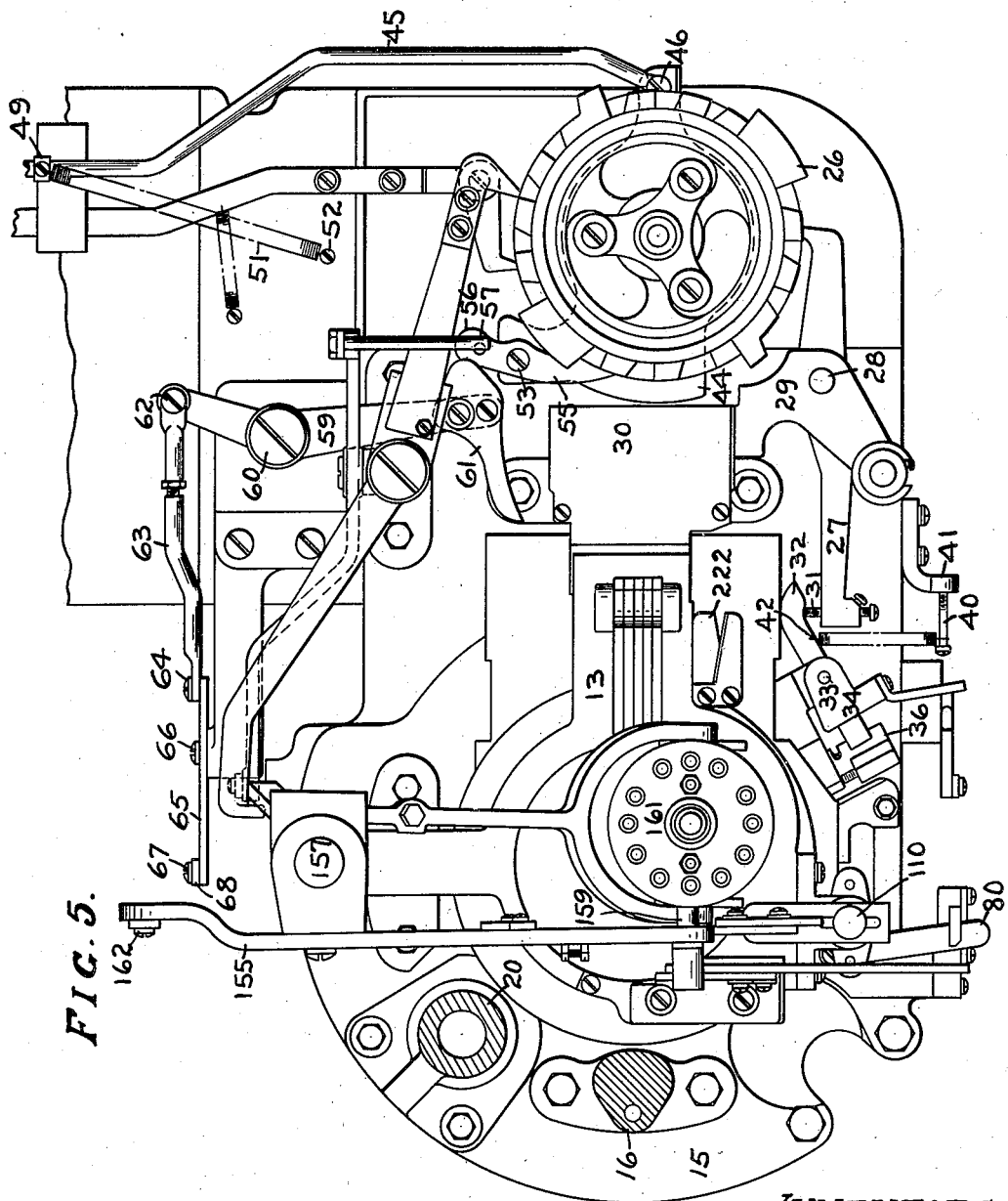

Feb. 14, 1939.  R. H. LAWSON ET AL  2,146,750
KNITTING MACHINE
Filed Feb. 3, 1934    15 Sheets-Sheet 6
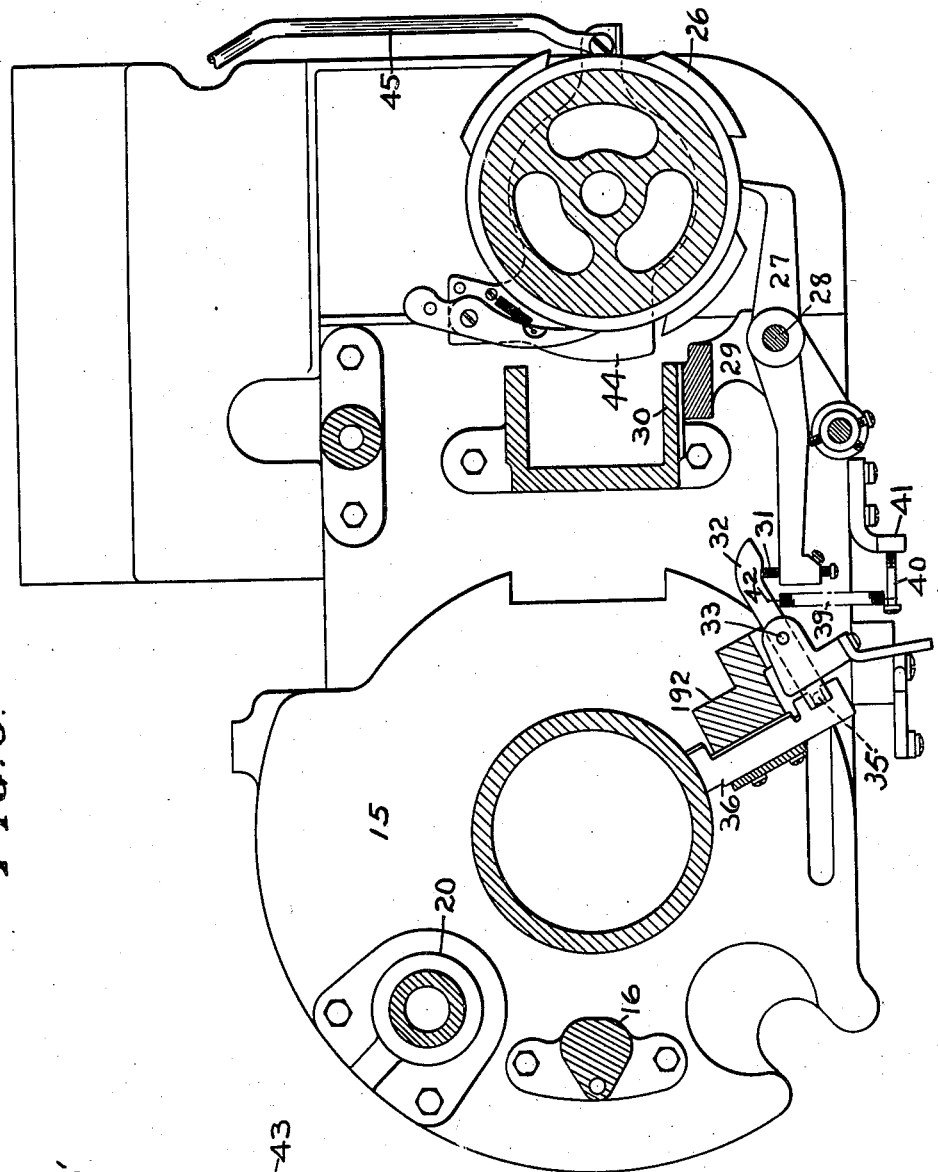
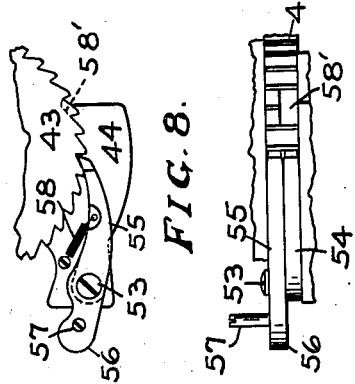
INVENTORS:
ROBERT H. LAWSON,
ISAAC H. C. GREEN,
By Roy F. Lovell
ATT'Y.

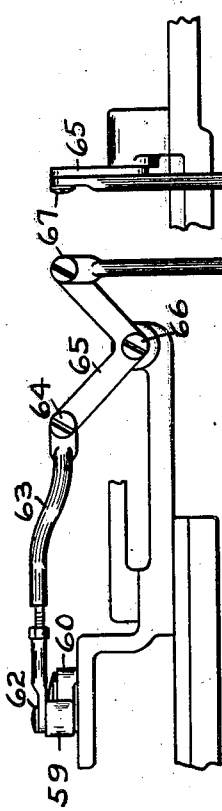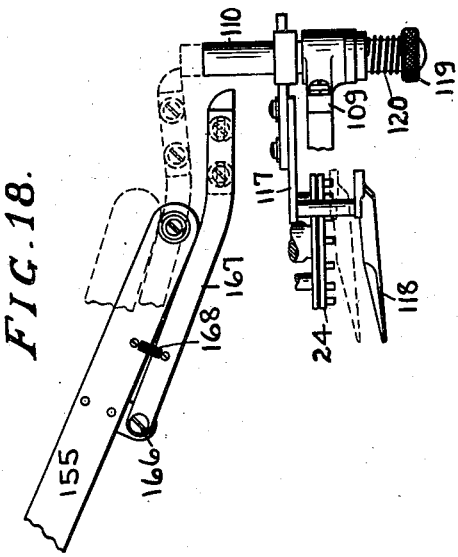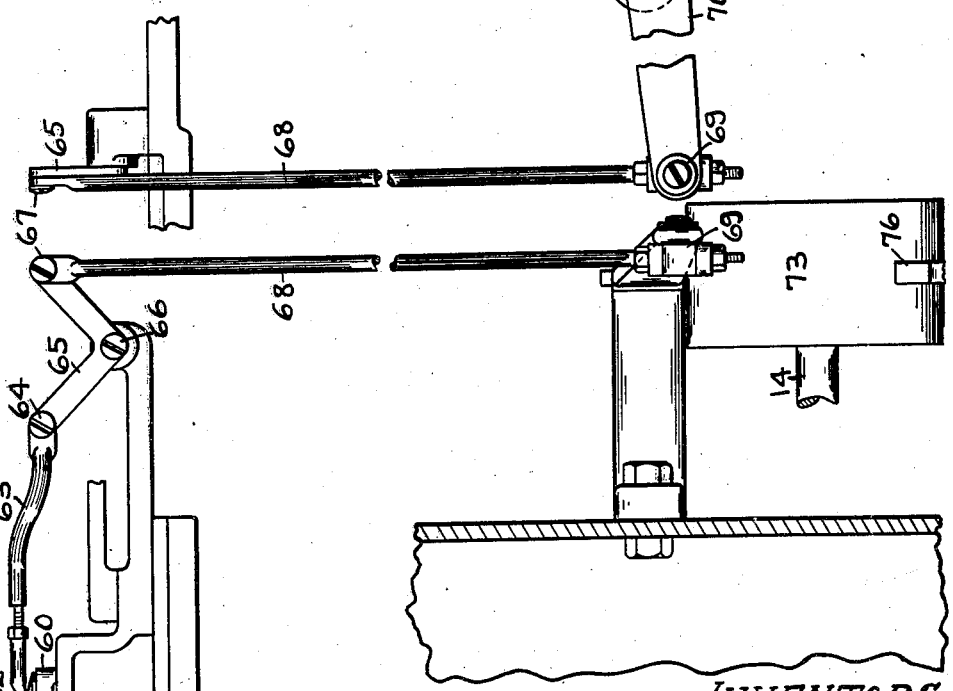

Feb. 14, 1939.  R. H. LAWSON ET AL  2,146,750
KNITTING MACHINE
Filed Feb. 3, 1934   15 Sheets-Sheet 8

INVENTORS:
ROBERT H. LAWSON,
ISAAC H. C. GREEN,
BY Roy F. Lovell
ATT'Y.

Feb. 14, 1939.   R. H. LAWSON ET AL   2,146,750
KNITTING MACHINE
Filed Feb. 3, 1934   15 Sheets-Sheet 9

INVENTORS:
ROBERT H. LAWSON,
ISAAC H. C. GREEN,
BY Roy F. Lovell,
ATT'Y.

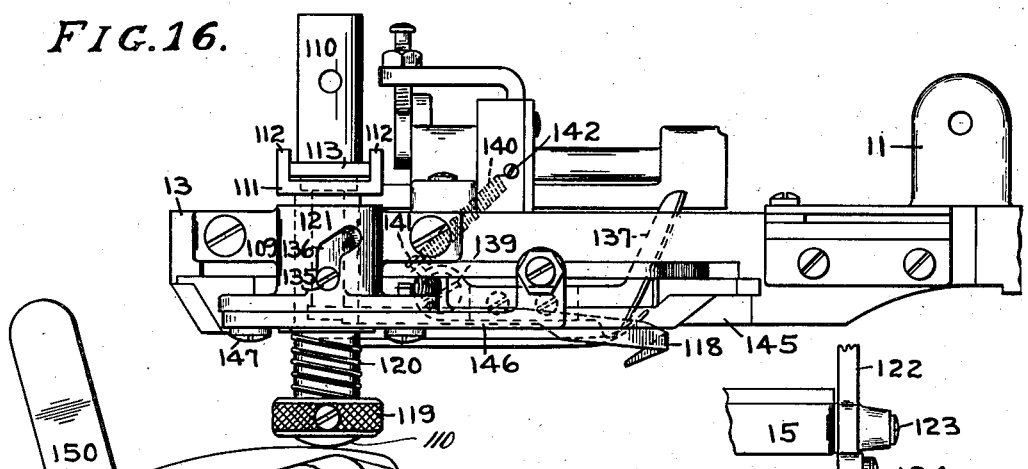

Feb. 14, 1939.  R. H. LAWSON ET AL  2,146,750
KNITTING MACHINE
Filed Feb. 3, 1934  15 Sheets-Sheet 11

INVENTORS:
ROBERT H. LAWSON,
ISAAC H. C. GREEN,
BY Roy F. Lovell,
ATT'Y.

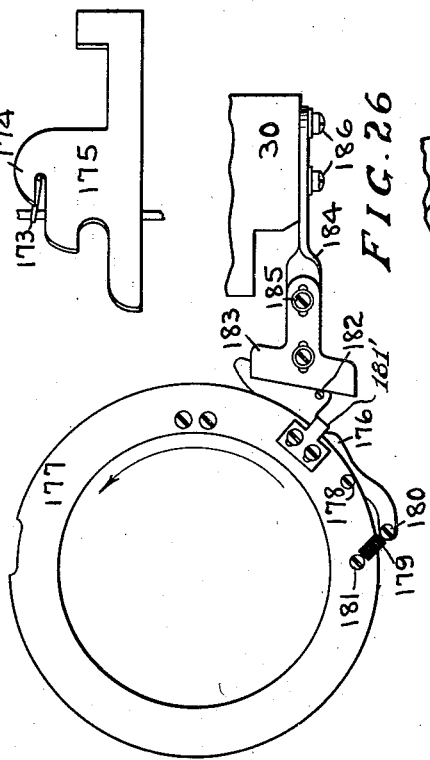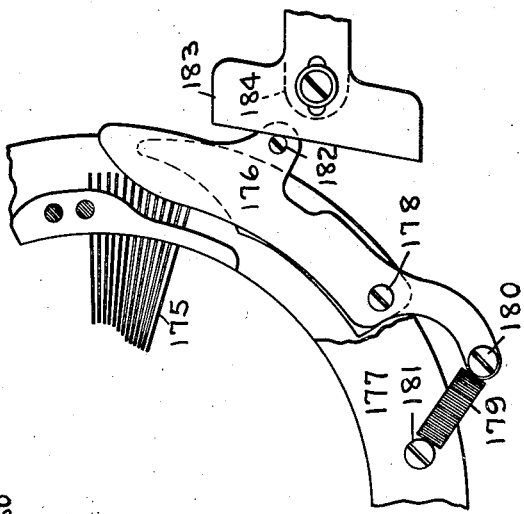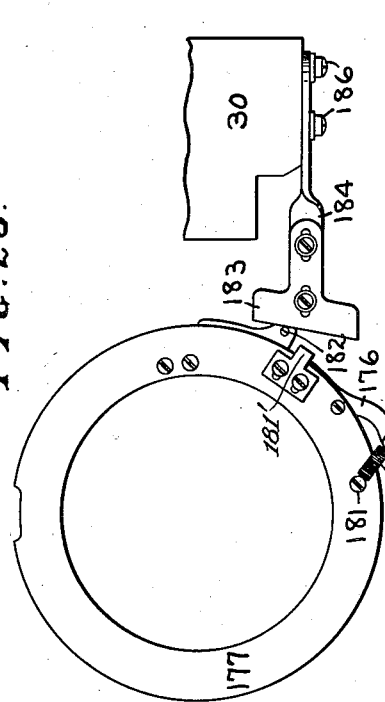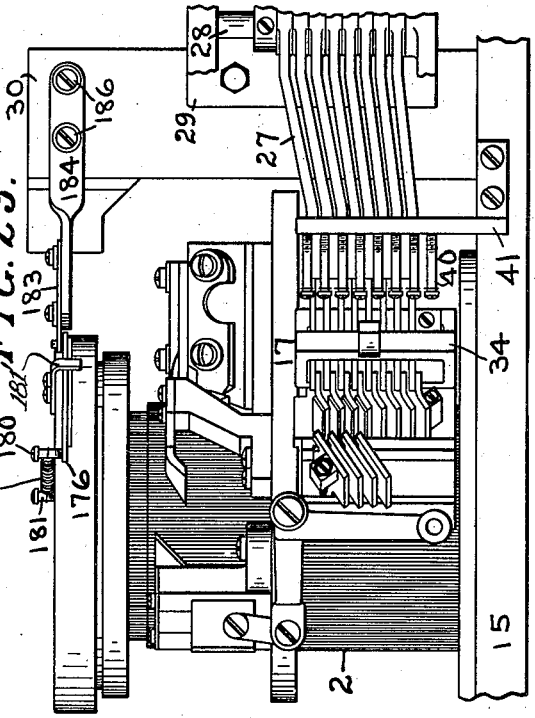

Feb. 14, 1939.  R. H. LAWSON ET AL  2,146,750
KNITTING MACHINE
Filed Feb. 3, 1934   15 Sheets-Sheet 13
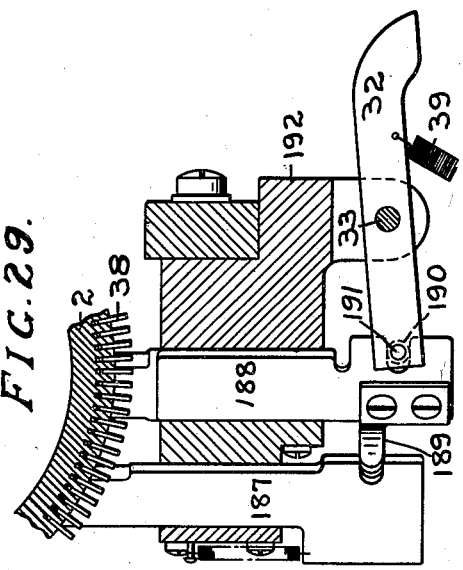
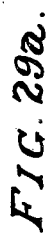
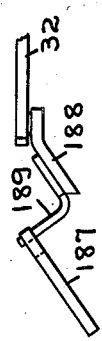
INVENTORS:
ROBERT H. LAWSON,
ISAAC H. C. GREEN,
BY Roy F. Lovell,
ATT'Y.

Feb. 14, 1939. R. H. LAWSON ET AL 2,146,750
KNITTING MACHINE
Filed Feb. 3, 1934   15 Sheets-Sheet 14

INVENTORS:
ROBERT H. LAWSON,
ISAAC H. C. GREEN,
BY Roy F. Lovell,
ATT'Y.

Feb. 14, 1939.   R. H. LAWSON ET AL   2,146,750
KNITTING MACHINE
Filed Feb. 3, 1934   15 Sheets-Sheet 15

INVENTORS:
ROBERT H. LAWSON,
ISAAC H. C. GREEN,
BY Roy F. Lovell,
ATT'Y.

Patented Feb. 14, 1939

2,146,750

UNITED STATES PATENT OFFICE 2,146,750

KNITTING MACHINE

Robert H. Lawson, Pawtucket, and Isaac H. C. Green, Central Falls, R. I., assignors to Hemphill Company, Central Falls, R. I., a corporation of Massachusetts Application February 3, 1934, Serial No. 709,664

43 Claims. (Cl. 66—135)

This invention relates to improvements in knitting machines and methods of knitting, the knitting machine being an improvement on that disclosed in the Lawson Patent No. 1,702,608, February 19, 1929.

In the drawings:

Fig. 4 is a view in side elevation of pattern mechanism for varying the incorporation of the patterni. or wrap threads;

Fig. 5 is a plan view of the machine;

Fig. 6 is a plan view partly in section showing a cam for operating upon the needle selecting jacks and means for controlling the in and out movements of the cam;

Figs. 7 and 8 are detail views showing pawl mechanism for advancing the drum that in turn controls the radial positions of the jack selecting cams;

Figs. 9 and 10 are views taken at right angles to one another showing mechanism for acting upon a pattern drum pawl;

Fig. 16 is a fragmentary view in elevation showing the latch ring and associated wrapping mechanism as well as means for acting upon parts associated with the wrapping mechanism preparatory to reciprocatory knitting;

Fig. 17 is a fragmentary view supplemental to Fig. 16;

Fig. 18 (sheet 7) is a fragmentary view showing mechanism for restoring parts associated with the wrap stripe mechanism to their operative position at the completion of reciprocatory knitting;

Fig. 23 is a view in elevation showing means for maintaining the sinkers in a relatively forward position to prevent loops from climbing above the sinker nibs;

Fig. 24 is a fragmentary view in plan of a portion of the mechanism shown in Fig. 23, the sinker cam being in a retracted position;

Fig. 25 is a view similar to Fig. 24 but with the sinker cam in an in position;

Fig. 26 is a relatively enlarged view and with a portion of the cap plate of the sinker cam removed more clearly to show the action of the cams upon the sinkers;

Fig. 27 is a detail view showing the normal tendency of a needle when moved to an elevated position to carry a loop above the sinker nib;

Fig. 28 is a fragmentary plan view showing a modified form of jack selecting means to permit selection of jacks at two points to obtain so-called color within color work;

Fig. 29 is an enlarged fragmentary view, partly in section, showing some of the mechanism shown in Fig. 28 and with parts removed more clearly to show the two jack selecting cams;

Fig. 29a is a fragmentary edge view of the cams shown in Fig. 29;

Figure 1:
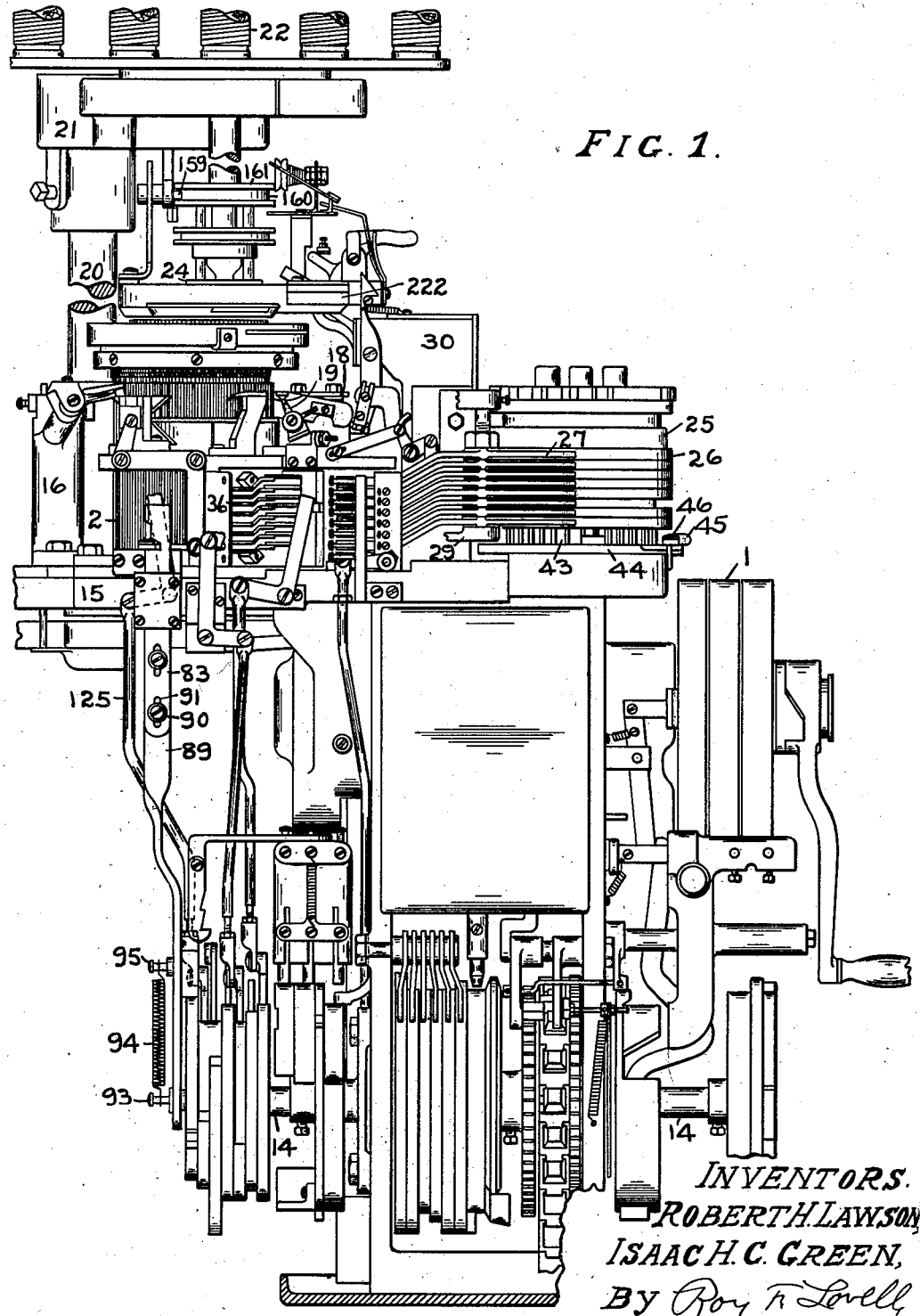
Fig. 1 is a view in front elevation of a knitting machine constructed to knit wrap stripes.
Figure 2:
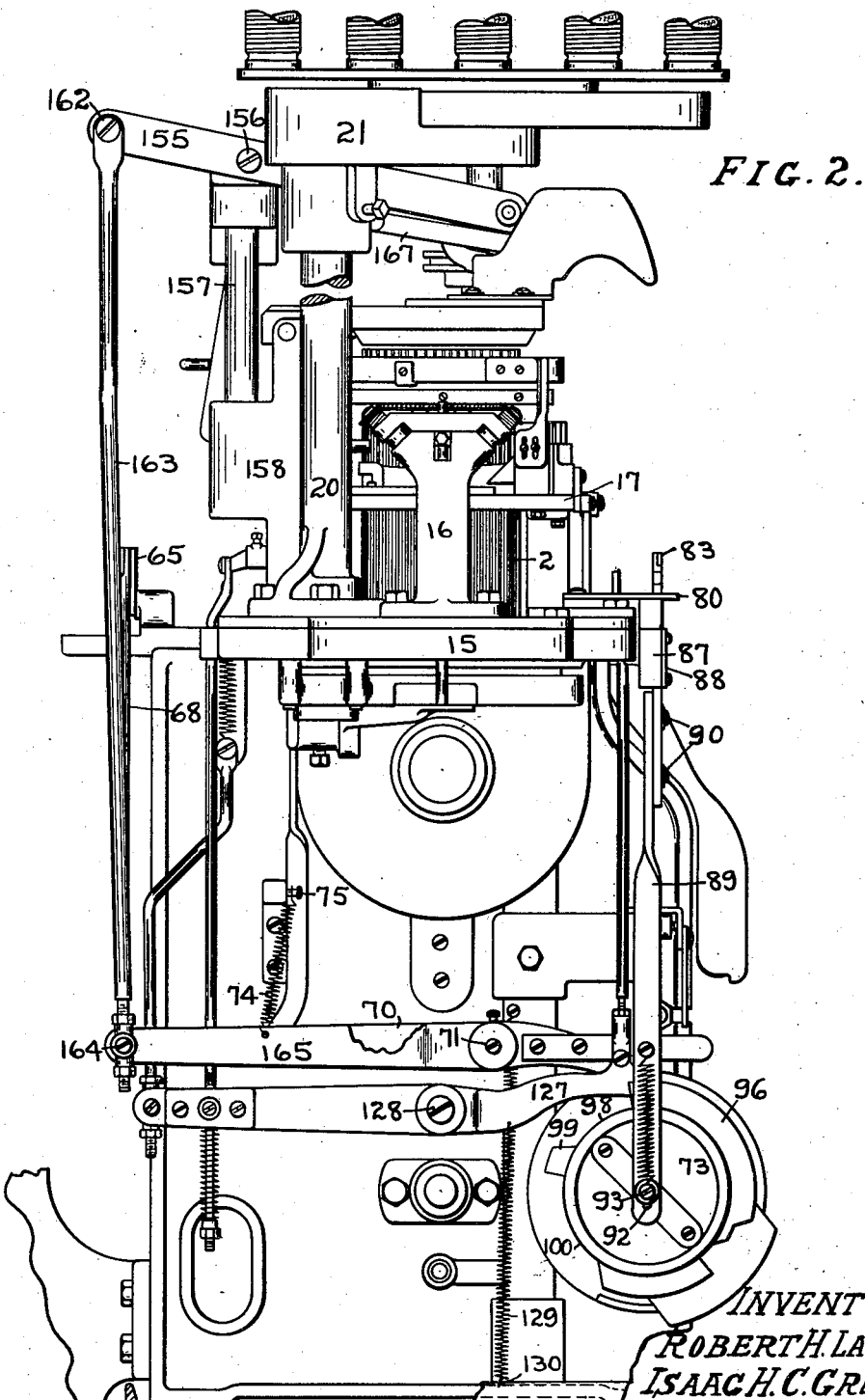
Fig. 2 is a side elevational view of the machine shown in Fig. 1.
Figure 3:
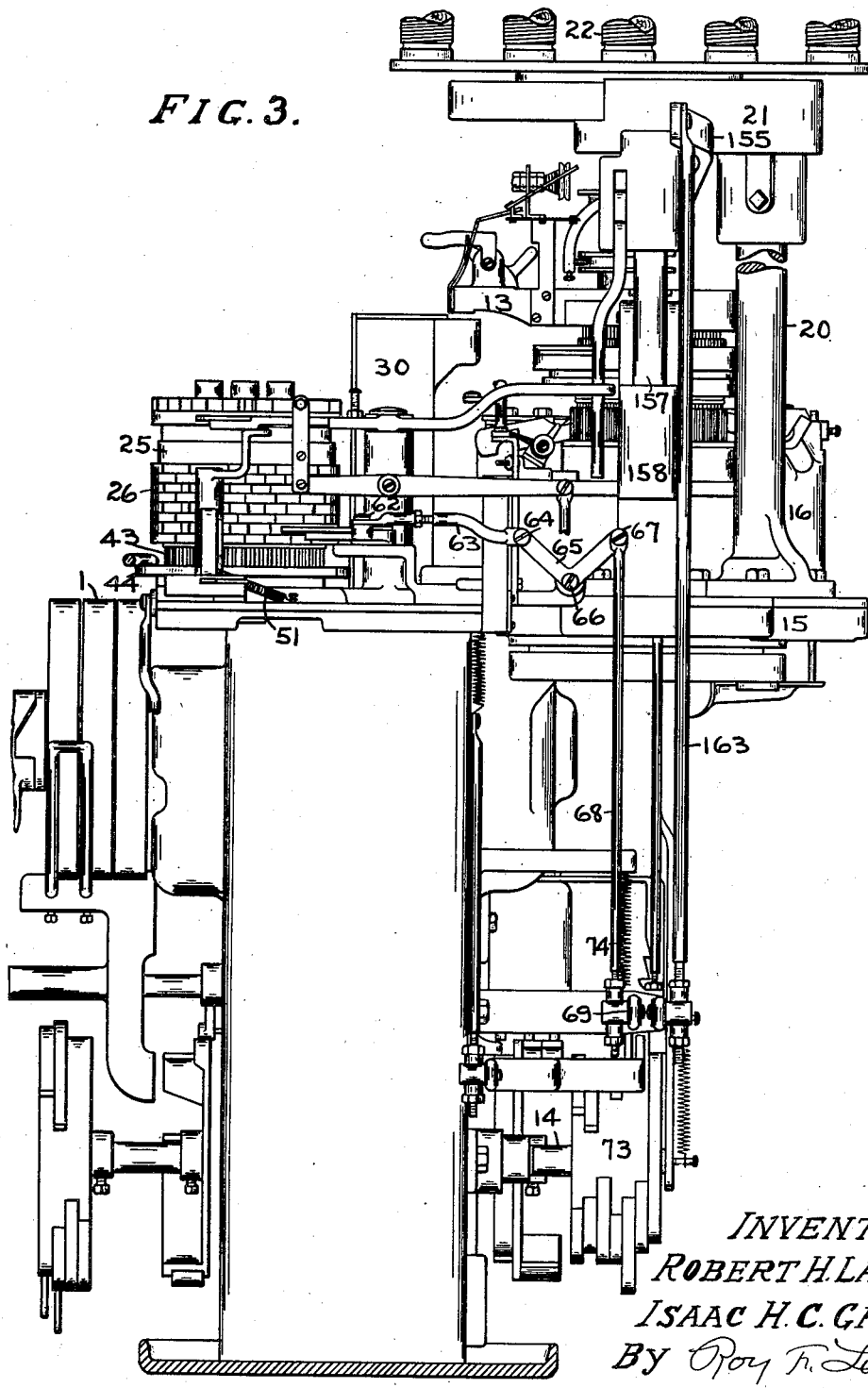
Fig. 3 is a view of the machine in rear elevation.

The knitting machine while similar to that shown in the mentioned Lawson Patent 1,702,608 in that it is adapted to knit the same type of fabric, has incorporated therein many improvements over the construction shown in the former patent. Briefly referring to the parts not directly concerned with the present improvements, numeral 1 indicates the fast, slow and loose pulleys by which the machine is driven in a manner similar to that shown in the said Lawson patent. The needle cylinder 2 is preferably mounted to rotate continuously in one direction at times and to reciprocate at other times as is usual in present day hosiery knitting machines. The needle cylinder 2 is slotted and within the slots thereof are mounted for sliding movements needles 3, beneath the needles and within the needle cylinder slots are mounted jacks 4, Fig. 19. All of the needles are supplied with yarns from any one or more of the yarn levers 5, 6, 7, 8, 9, each of which is pivotally mounted upon a pin 10 having bearings in upstanding ears 11 carried by the mouthpiece extension 12 constituting part of the latch ring 13. The knitting operations are, as in Patent 1,702,608, controlled by cams mounted upon the main cam shaft 14. Upon the so-called circular base 15 are mounted cams hereinafter to be described for acting upon the jacks 4. The usual widening pick bracket 16 is also mounted upon and upstands from the said circular base. Positioned above the circular base is a cam plate 17 upon which are mounted cams for acting upon the needles in a manner hereinafter to be more specifically described. The cam plate 17 is connected to the main cam block 18 which has mounted thereon usual narrowing picks 19. Connected to and upstanding from the circular base 15 is a post 20 on the upper end of which is mounted a bracket 21 which carries bobbins such as 22 as well as suitable yarn tensions, etc. (not shown). Within the post 20 is mounted a shaft (not shown) which transmits rotary movements from the ring gear driving the needle cylinder 2 to a shaft 23 to which is connected a disc 24 having eyelets therein through which threads are wrapped around selected needles, all as shown in Patent 1,702,608.

Upon the extension of the circular base 15 is mounted a drum 25 having eight rows of cams 26 thereon each row of which is engaged by one of eight levers 27 which are pivoted intermediate their ends as at 28 to a bracket 29 (Fig. 5) fastened to the yarn lever box 30. The other arms of the levers 27 have adjustably passing therethrough contact screws 31 adapted to engage levers 32, the levers 32 being pivoted at 33 to a bracket 34 fastened to and extending outwardly from the circular base 15. The other arms of the levers 32 terminate in extending pins which engage in slots 35 in cams 36. The jacks 4 (Fig. 19) have lower butts 37 and upper, frangible butts 38 which are selectively engaged by the cams 36. The cams 36, through the instrumentality of the drum cams 26 and lever connections leading therefrom, are selectively positioned adjacent to the needle cylinder 2, springs 39 which are attached to pins 40 projecting laterally from a bracket 41 being connected at their other ends as at 42 to their respective levers 32 and tending to advance all the cams 36 to a position adjacent to the needle cylinder 2 while the cams 26 selectively retract the cams 36 from their jack engaging positions adjacent to the needle cylinder.

In Figs. 1, 2, 3, 4, 5, 6, 7, 8, 9 and 10 are shown means for periodically advancing the drum 25 whereby changes in the operative positions of the several cams 36 can be effected from course to course of knitting or as desired. Fast to the drum 25 is a ratchet 43 and between the same and the circular base is loosely mounted a pawl carrying plate 44 to which reciprocating movements are imparted by means of a link 45 pivotally connected to the plate 44 at 46. The link 45 consists of two adjustably connected sections the other of which is pivotally connected at 47 to a depending lever 48 which latter is periodically actuated in any suitable manner as by means of pins on the "104" gear (not shown). Fast to the link 45 intermediate its end is a collar 49 and connected thereto at 50 is a coil spring 51 which at its other end is fastened at 52 to the extension of the circular base 15. About diametrically opposite the pivotal point 46, plate 44 has pivotally connected thereto at 53 a lower pawl 54 and an upper pawl 55 the latter of which has an arm 56 extending beyond the pivot 53, said arm being provided with an upstanding pin 57. Normally both pawls are in engagement with the teeth of the ratchet 43 being maintained in such position as by means of springs 58. At the completion of the wrap stripe knitting it is desirable to retime the mechanism so as to have the drum 25 in the same circumferential position at the commencement of the wrap stripe knitting of each stocking; consequently retiming means are employed which include a blank space 58' in the ratchet 43 along which the lower pawl 54 may reciprocate idly. The upper pawl 55 is automatically withdrawn from its ratchet teeth engaging position by means of a lever 59 pivoted intermediate its ends at 60 to the machine frame. The said lever 59 has a shoe 61 positioned adjacent to the pin 57. The other arm of the lever 59 is pivoted at 62 to an adjustable link 63 which latter is pivoted at 64 to a bell crank lever 65 the latter being pivoted to the machine frame at 66 and having pivotally connected at its other arm at 67 and depending thereupon a link 68. The link 68 at its lower end is adjustable and is pivotally connected at 69 to a horizontally disposed lever 70, Fig. 10, pivoted at 71 to the machine frame and extending beyond the said pivot in the form of a toe 72 normally maintain in contact with the cam drum 73 mounted upon the cam shaft 14 as by means of a spring 74, Figs. 2 and 3, which is connected at one end to a pin 75 laterally projecting from the machine frame and at its other end to one arm of the lever intermediate its ends.

By means of the connections just described after the wrap stripe portion of the stocking or other article has been knitted a cam 76, Fig. 10, mounted on the cam drum 73 moves in the direction of the arrow and engages the toe 72 to rock the lever 70 thereby causing the shoe 61 to engage the pin 57 and rock the upper pawl 55 on its pivot thereby withdrawing its end from engagement with the ratchet teeth. Thereafter the lower pawl 54 alone engages the ratchet teeth 43 and advances the drum 25 until the space 58' in the ratchet 43 permits the drum 25 to come to rest until the pattern drum 73 is again moved to such an extent as to cause the cam 76 to ride from under the toe 72 whereupon the spring 74 rocks the lever 70 and causes the shoe 61 to be moved away from the pin 57, the spring 58 then acting to cause the pawl again to engage the ratchet teeth 43. After the ratchet 43 is once again racked by the pawl 55, both 54, 55 thereafter engage the ratchet teeth 43 and advance the drum 25 as before.

Referring particularly to Figs. 1, 2, 5, 11, 12 and 13, a cam 77 is shown as being slidable in a bracket 78 attached to the circular base 15. Pivotally connected to the bracket 78 at 79 is a bell crank lever 80, one arm of which engages an upstanding pin 81 which passes through a slot in the bracket 78 and into engagement with a laterally projecting arm 82 connected to the cam 77. The other arm of the bell crank lever 80 is engaged by the upper end of a cam 83 which is provided with three faces or steps 84, 85 and 86. The said cam 83 is slidably mounted in a bracket 87 fastened to the bracket 78 said cam 83 being retained in position in the said bracket 87 as by means of a cap plate 88. The cam 83 extends through the bracket 87 in the form of a depending rod being adjustably connected to another depending rod 89 as by means of screws or bolts 90, elongated slots 91 permitting the desired adjustment between the two rods. At its lower end the rod 89 is slotted as at 92, the slot receiving therein a pin 93 fastened to the drum 73. Fastened to the pin 93 is a coil spring 94 at its upper end connected to a second pin 95 projecting laterally from the rod 89 and fast thereto. Thus the coil spring 94 tends to maintain the cam 83 in the extreme lower position, the cam 77 at such time being in its outermost position, i. e., spaced from the needle cylinder. The cam 83 is maintained in the uppermost position by means of high cam 96 on the drum 73 such cam being in engagement with a lateral lug 97 fast to the rod 89. When, due to a further rotation of the drum 73 in the direction of the arrow, Fig. 12, the lug 97 rides off the high cam 96, the spring 94 causes the rod 89 and consequently the cam 83 to move downwardly until the lug 97 comes to rest in contact with the drum surface at 98 at which time the heel is being knitted. The next movement of the drum 73 causes the lug 97 to ride up a cam 99 also fast to the drum 73. The cam 99 is of intermediate height and consequently the cam 83 is raised to an intermediate position whereupon the flat face 85 of the said cam 83 engages the arm of the bell crank lever 80, the cam 77 at such time being maintained in an intermediate position while the instep of the stocking is being knitted. Further rotation of the drum 73 causes the cam or lug 97 to ride off the drum cam 99 and onto the surface of the drum as at 100, the cam 97 remaining in such position during the knitting of the toe.

Figure 11:
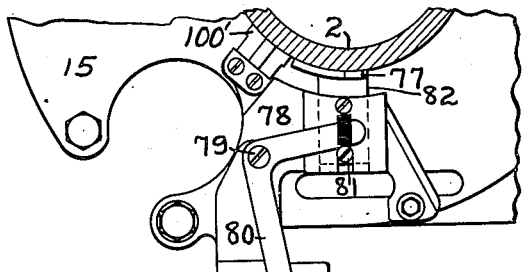
Fig. 11 is a fragmentary plan view showing a cam and controlling means therefor, said cam imparting preparatory movements to long butt jacks during the knitting of the instep of the stocking and to all the jacks during the knitting of the leg of the stocking.
Figure 12:
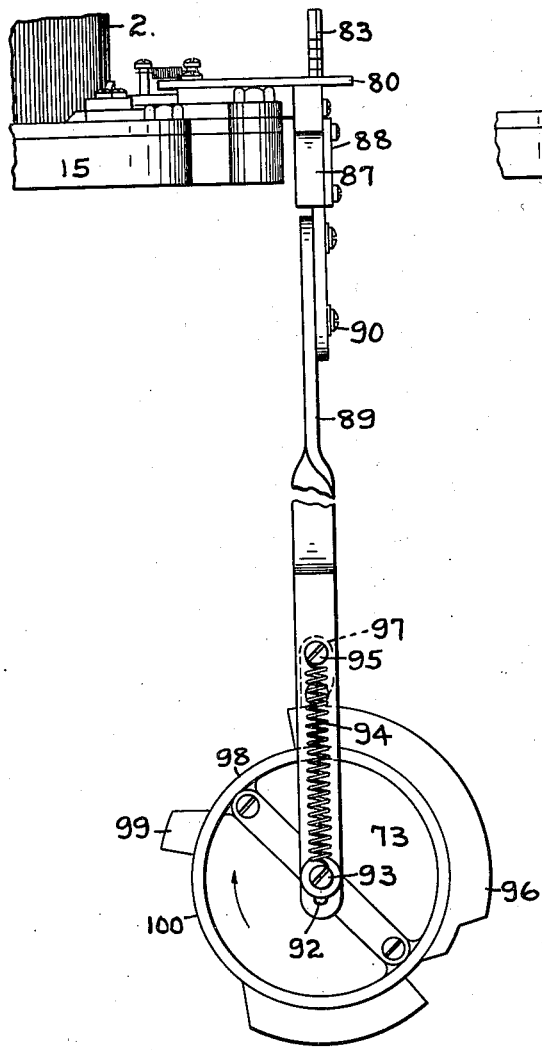
Fig. 12 is an elevational view of the mechanism shown in Fig. 11.
Figure 13:
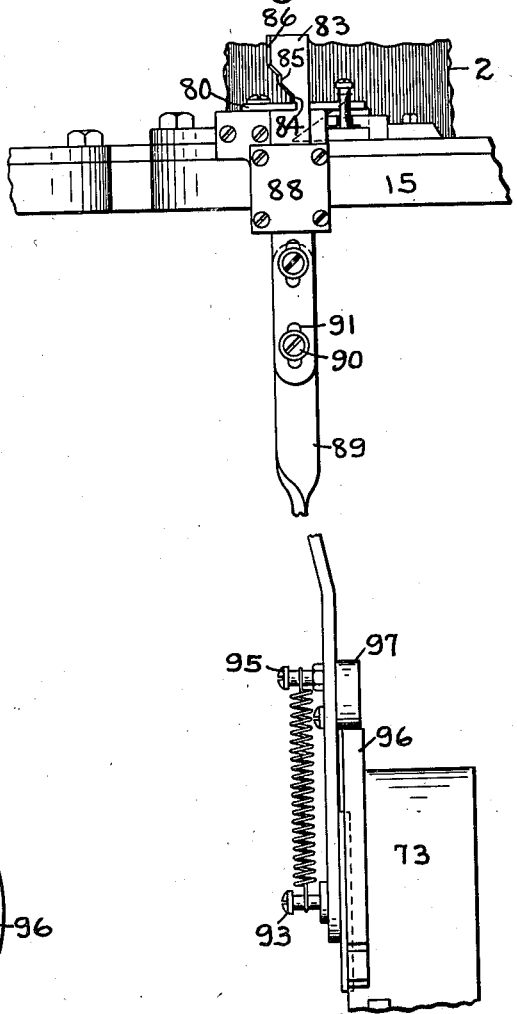
Fig. 13 is a view similar to Fig. 12 but taken at right angles thereto.

As shown in Fig. 11 the cam 77 is adapted to act upon all of the lower butts 37, i. e., both long and short, during the knitting of the leg for all around wrap stripe knitting. At such time the long jack butts as well as the short jack butts are engaged by the cam 77 and given a preparatory movement to raise the said butts to a position to be further raised by the several cams 36 by which latter movement the needles above the said jacks are raised to a needle wrapping position. It will be understood that the preparatory movement imparted to the jacks 4 by the cam 77 does not elevate the companion needles, the needles and their jacks being spaced when they are in their lowermost position. When knitting the instep of the stocking it is desirable that the instep needles only shall have threads wrapped therearound and for that reason the jacks companion to the sole needles have short butts 37'; consequently, when the cam 77 is withdrawn to an intermediate position as by means of the cam 99, the short butts 37' are not engaged by the cam 77 and the sole needles are not elevated to a position to be wrapped although the instep needles are so elevated by the long butt jacks companion thereto. Although the cam 77 has been disclosed as being moved to a completely retracted position as during the knitting of heels and toes it is not essential that the cam be so withdrawn as the maintaining of the cams 36 in a retracted position obviates the necessity of complete withdrawal of the cam 77.

Seated within a recess in the circular base 15 and fast thereto is a cam 100' immediately in advance of the cam 77. The said cam 100' merely levels the lower butts 37 of all of the jacks by raising them a short distance so that butts travelling along closely adjacent to the opposite surface of the circular base 15 will not engage the leading edge of the cam 77 and become broken. A cam 101 engages the needle butts and lowers or levels the needles after they have been raised by cams 36, which lowering of the needles permits them to be engaged by the top center cam, Fig. 22, otherwise the butts of the needles might engage the point of the cam and become broken.

Figure 14:
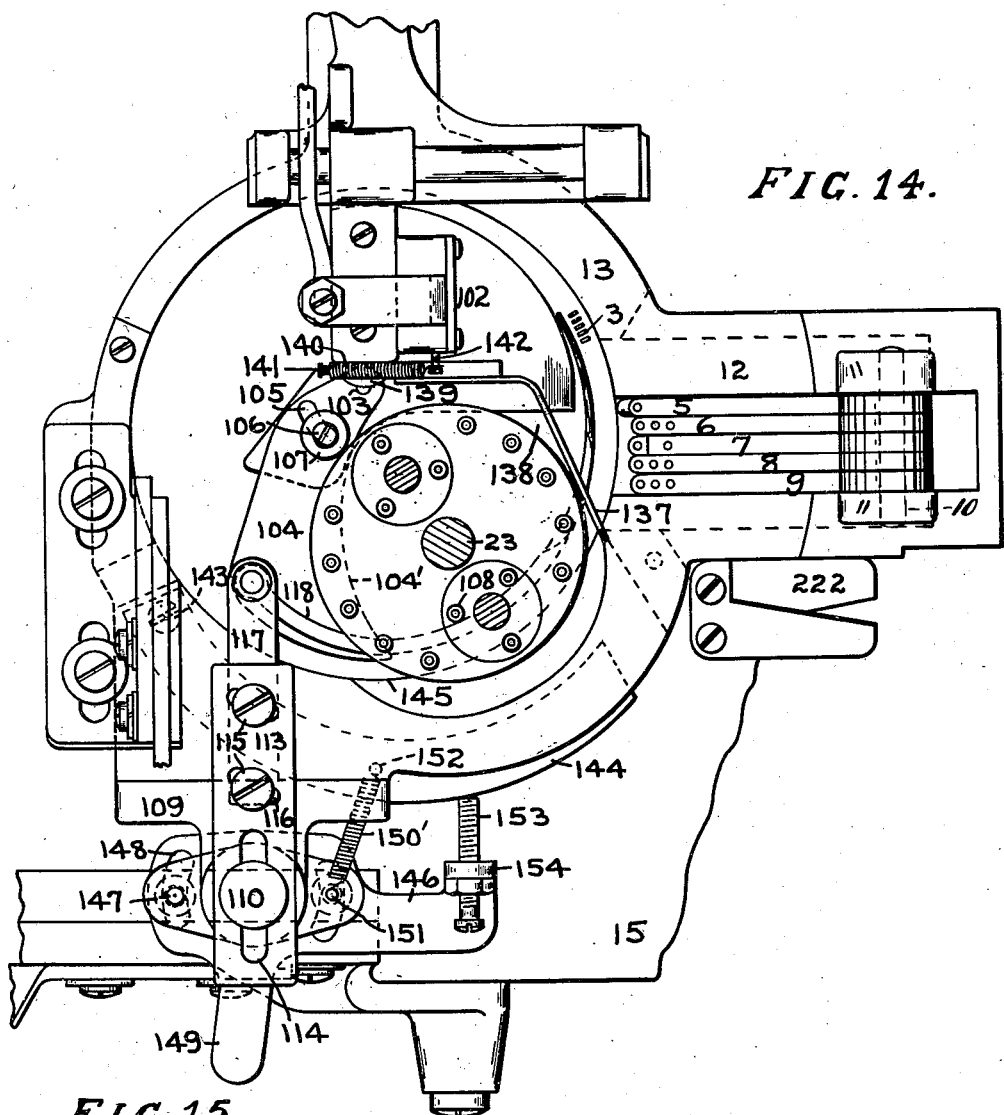
Fig. 14 is a plan view showing the latch ring and associated wrap mechanism.
Figure 15:
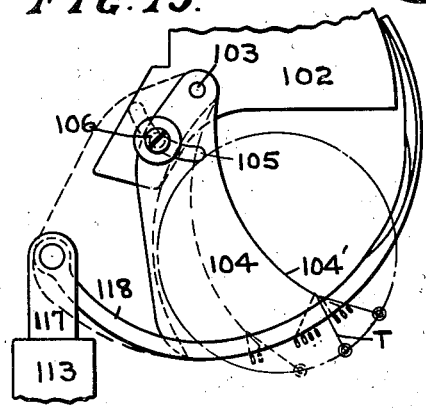
Fig. 15 is a fragmentary view of a portion of the mechanism shown in Fig. 14 and showing particularly an adjustable cam for narrow or wide wrap stripes.

Referring specifically to Figs. 14, 15 and 16 there is shown the latch ring 13 upon which is mounted a so-called binder plate 102 having mounted thereon any usual or suitable means for cutting and clamping any of the main yarns when they are withdrawn from feeding relation with respect to the needles excepting the high splice yarn when it is withdrawn for partial courses during the knitting of the high splice, there being a supplemental clamping and cutting mechanism provided for this purpose which is located at the left of the binder plate 102, Fig. 14. Attached to the plate 102 as by means of a pivot pin 103 is an arcuate plate 104, intermediate the ends of which is an elongated slot 105 and passing through the said slot is a pin or screw 106, a washer 107 being interposed between the plate 104 and the head of the screw 106. The screw 106 passes through the slot 105 and into threaded engagement with the plate 102. The pivotal and adjustable mounting of the plate 104 with respect to the plate 102 permits the said plate to be swung upon its pivot so that the inner arcuate edge 104' of the plate may be moved either to the right or to the left, Fig. 14. When wrapping a group of needles, say selected ones of a group of ten, the wrap thread is connected to the fabric at the wale knitted by the last needle of the said group of ten; and consequently, when the needles move around to be wrapped for the next course, the said wrap thread may not be properly caught in the hook of the first needle (which would be at the right, Fig. 15, of the last needle just mentioned) unless some provision be made to cause the thread to be properly engaged within the hook of such needle. This function is performed by the arcuate edge 104' of the plate 104 and by that is meant when the plate 104 is adjusted to a position to the right, Fig. 15, i. e., from the dotted line to the full line position, the said edge 104' engages the thread and bends or deflects the same adjacent to and in position to be engaged by the first needle in the following course. The edge 104' acting as aforesaid, might be described as constituting a means which acts upon a wrap thread to deflect it in the direction of the rotary movements of the needles, i. e., in an anti-clockwise direction, Figs. 14 and 15, and to such a position that the first needle of the group of needles any one of which may knit the said wrap thread shall engage the said wrap thread during the knitting of each of a plurality of courses. The edge 104' also serves to cooperate in confining the wrap threads, that is, preventing them from passing above the binder plate 102. On the other hand, when knitting all round so-called single needle stripes by the wrap threads, it is not essential that the plate 104 be maintained in its extreme right-hand position although the knitting of single needle wrap stripes can just as well be effected with the plate 104 in such right-hand position. There is, however, one objection to maintaining the plate 104 in a right-hand position, Fig. 15, when wrapping single needles, namely, the edge 104' necessarily bends or deflects the wrap threads and consequently imposes some tension upon such threads making it somewhat more difficult for the take-up (not shown) to pull the wrap stripe thread upwardly and through the eyelets 108 as the wrapped needles again approach the wrapping point in a following course of knitting.

Again referring to Figs. 14, 16 and 17, the latch ring 13 has attached thereto and projecting laterally therefrom a bracket 109 in which bracket is vertically mounted a two-part shaft or stud 110. Integral with the shaft 110 intermediate its ends is a portion 111 having upstanding ears 112 between which is adjustably and rigidly fastened a plate 113 a longitudinal slot 114 providing for certain adjustments. Fastened to the plate 113 as by means of screws 115 which pass through diagonal slots 116 provided in the plate 113, as an arm 117 the latter having a depending portion to which is connected an arcuate arm or finger 118. The pin and slot connection 110, 114 permits the arm 118 to be moved to a position toward or away from the needle circle, some only of the needles being indicated at 3, Fig. 14. Furthermore, the diagonally disposed slots 116 and the pins or screws 115 permit a pivotal or swinging adjustment of the finger 118. In addition to the possible adjustments of the finger 118 the shaft 110 extends downwardly through the bracket 109 terminating in a knurled head 119 connected with which is one end of a coil spring 120 the other end being fastened to an adjacent face of a hub 121 which is integral with the bracket 109. The knurled headed nut 119 being in threaded engagement with the lower end of the shaft 110 permits the varying of the tension of the coil spring 120 which serves to maintain the shaft 110 and consequently the finger 118 in a relatively lowered and operative position. As shown more clearly in Fig. 16 the shaft 110 is engaged by the upper and cam shaped edge of a bell crank lever 122 which lever is pivoted at 123 to the circular base 15. Pivoted to the other arm of the bell crank lever at 124 is an adjustable link 125 in turn pivoted at 126 to a lever 127. The lever 127 is pivoted to the machine frame as at 128 (Figs. 2 and 17), a coil spring 129 being attached to the lever 127 intermediate its ends and being also connected to the machine frame as at 130. As shown in Fig. 17 the drum 73 is provided with cams 131, 132 adapted to engage the lever 127 and rock the same against the tension of the spring 129 which normally maintains the toe of the lever 127 in engagement with the drum surface 133 between the cams 131 and 132 where it remains during the knitting of the leg of the stocking. Thereafter continued rotation of the drum in the direction of the arrow causes the cam 131 to engage the toe of the lever 127 whereupon the shaft 110 is elevated, this action occurring just prior to the first reverse stroke of the knitting of the heel. When the knitting of the heel is completed the toe of the lever 127, as the drum 73 advances in the direction of the arrow, drops off the cam 131 and onto the surface of the drum 73 at 134 where it remains during the knitting of the foot of the stocking. Thereafter further rotation of the drum 73 causes the cam 132 to engage the toe of the lever 127 again rocking the bell crank lever 122 and elevating the shaft 110, the toe of the lever 127 remaining on the cam 132 during the knitting of the toe of the stocking.

Elevation of the shaft 110 causes the finger 118 to be moved upwardly to the dotted line position of Fig. 18, and due to a pin 135 on the shaft 110 engaging in a bayonet slot 136, a slight rocking movement is also imparted to the shaft 110 which causes the tipped end of the finger 118 to move inwardly toward the axis of the needle cylinder and consequently away from the needle path. The connections hereinbefore described effect the inward and upward movement of the finger 118 with respect to yarn guides and during knitting, such movement being free, i. e., not being effected as by removal of a screw or other retaining element. The purpose of the described upward and inward movement of the end of the finger 118 is to prevent the possibility of bent needles engaging the tipped end of the finger 118 during the reverse stroke of heel and toe or other knitting which obviously would result in the breaking of many needles and possibly other parts of the knitting machine.

Figs. 15 and 16 illustrate the necessity of having the plate 104 in a relatively advanced position to cause the forward edge thereof again to present a thread T to the first needle of a group when the said first needle is separated by several needles of the last needles wrapped during the proceeding course, at the same time having the said plate 104 sufficiently retracted to avoid the said thread T being caught by the hook of a needle in advance of the said group of needles; consequently, adjustment of the plate 104 is necessary when knitting closely adjacent wide stripes to insure that a thread shall be wrapped around the first needle of a series but not around a needle in advance thereof.

In Figs. 14 and 16 is shown a finger 137 which assists in confining the wrap threads within the opening 138 defined by such finger, the arcuate edge 104' of the plate 104, the adjacent edge of the plate 102 and the finger 118. The finger 137 which serves to keep the wrap threads out of the clamping and severing mechanism and from wrapping around the supporting means therefor, is pivoted at 139 to an upright constituting part of the clamping and cutting mechanism. A spring 140 which is attached at one end to a pin 141 fastened to the finger 137 beyond the pivot thereof and at its other end to a pin 142 projecting laterally from an upright constituting part of the clamping and cutting mechanism, maintains the finger in the relatively lowered position shown in Fig. 16, but when the shaft 110 is elevated in the manner just described, the finger 118 contacts with the under edge or surface of the finger 137 thereby rocking the same upon its pivot 139 against the tension of the spring 140. Thus the finger 137 is freely movable upwardly with respect to the yarn guides during knitting, such upward movement being effected by engagement with the finger 118.

Pivotally connected at 143 to the underside of the latch ring is an arcuate gap closer 144 which is adapted to be moved from the position shown in Fig. 14 to a position inwardly thereof and directly above a bar 145 which is attached to and forms part of the latch ring 13 and maintains the latches of the normal level needles open. The latch ring above the bar 145 is removed thus providing a recess in the latch ring to permit the wrapping head to overlap the bar 145 as shown in Fig. 14, the said recess thus facilitating the wrapping of the needles. The gap closer 144 is in its inner operative position only during heel and toe or other reciprocatory knitting when the instep or other needles are above the normal knitting level, the said closer serving at such times to avoid the unintentional closing of needle latches when latch needles are used. For actuating the gap closer, i. e., moving it to and from the gap closing position means are provided including a lever 146 which is pivotally mounted on the shaft 110, screws or studs 147 depending from the bracket 109 engaging in curved slots 148 to limit the swinging movements of the lever 146. Projecting outwardly from the lever 146 and adjacent to the shaft 110 is a lug 149 which lug is adapted to be engaged by a lug or plate 150 adjustably connected to the upper end of one arm of the bell crank lever 122. Thus when either the cam 131 or the cam 132 engages the toe of the lever 127 the bell crank lever 122 is rocked and the lug 150 engages the lever arm 149 thereby rocking the lever 146 which in turn causes the gap closer 144 to be swung to an inward operative position. When the cam 131 or 132 as the case may be moves out from under the toe of the lever 127, the bell crank lever 122 is moved back to the position shown in Fig. 16 whereupon a spring 150' attached at one end to the bracket 109 as at 151 and at its other end to a pin 152 depending from the underside of the gap closer 144, retracts such closer to the position shown in Fig. 14. The contact between the lever 146 and the gap closer 144 is preferably an adjustable one, a screw 153 adjustably passing through a lug 154 carried by the lever 146 being the means employed.

The edge or surface of the bell crank lever 122 engaging the shaft 110 may consist of a plate adjustably fastened to the bell crank lever 122 as by means of pins or screws passing through elongated slots provided in one arm of the bell crank lever 122.

Referring to Figs. 1, 2, 3, 4, 5 and 18 there is shown a lever 155 pivoted at 156 to an upright post 157 secured to a bracket 158 fast to and upstanding from the circular base 15. The said lever 155 at one end thereof is provided with a pin 159 (Fig. 1) which takes into an annular recess 160 provided in a sleeve 161 fast to shaft 23 which carries the needle wrapping disc 24. The other arm of the lever 155 is pivoted at 162 to a depending link 163 the latter being adjustable in length and pivoted at 164 to a horizontally disposed lever 165 pivoted on stub shaft 71. The other arm of the lever 165 is in engagement with suitable cams disposed on the drum 73 for actuating the lever 165 and consequently raising the shaft 23 and disc 24 at desired times as preparatory to transfer of a rib top to the needles of the knitting machine and preparatory to the knitting of heels and toes of stockings or other reciprocatory knitting. Pivotally connected to one arm of the lever 155 at 166 (Fig. 18) is an arm 167, and a spring 168 which is attached at one end to the arm 167 and at its other end to the lever 155 normally retains said arm 167 in contact with the underside of the lever 155. The arm 167 is adapted to function immediately following the knitting of heels and toes or other reciprocatory knitting and as the wrapping knitting disc 24 is lowered to re-commence the wrapping of needles by engaging the shaft 110 and depressing the same if and when the spring 120 does not act to restore the shaft 110 and the parts associated therewith to the position shown in Fig. 16. If the shaft 110 and parts associated therewith remain in the upper position they occupy during the knitting of heels and toes, the thread eyelets carried by the disc 24, especially if they be of the type later to be described, strike the elevated finger 118 and become bent or broken. Although the pivotal mounting of the arm 167 serves no useful function while the shaft 110 is being depressed to the position shown in Fig. 16, such pivotal mounting of the arm 167 avoids a possible binding of parts when that arm 35 of the lever 155 as well as the disc 24 are again raised. If it were not for the pivotal mounting of the arm 167 the end thereof upon being raised might engage the shaft 110 and prevent the rocking of the lever 155 and elevation of the disc 24 or result in the breaking of some of the connecting parts. In this connection, it will be understood that when the arm 167 moves the shaft downwardly it remains in contact with such shaft momentarily finally snapping off the end of the shaft 110 to a position inwardly thereof.

Figure 20:
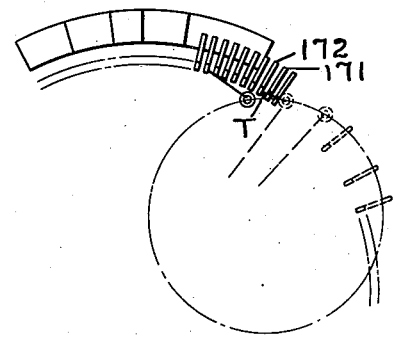
Fig. 20 is a plan view of some of the parts shown in Fig. 19.

Referring to Figs. 19–22, the usual needle raising and latch clearing cam 169 is indicated as being in a retracted position the center cam being raised as indicated at 170 to effect the clearing of the needle latches. The purpose of the retraction of the cam 169 and the constructing of the center cam to clear the needle latches is to permit such needle raising and consequent latch clearing to occur at a later phase of the knitting cycle. If the needles were raised by the cam 169 a non-wrap needle indicated at 171 might be raised back of the thread T as indicated in Fig. 20 in which case the bill of the hook of such needle might engage the thread T and displace the same in the hook of the wrap needle immediately in advance of the needle 171 and indicated at 172. Such displacement of the thread T within the hook of the needle 172 might adversely affect the plating or even cause the thread to be pushed out of the hook of the wrap needle 172.

The objection is overcome by causing the needles to be raised to clear their latches at a later phase of the knitting cycle by withdrawal of the cam 169 as described. The raising of the needles at a later point in the knitting cycle, i. e., by the cam 170, permits the finger 137 to lower the thread T and causes such thread T to be moved in the direction of the axis of the needle cylinder so that the subsequent raising of the needle 171 causes the bill of the hook of such needle to pass forwardly of the said thread, the foregoing being facilitated by the use of forward hook needles; furthermore, the thread T by the rotation of the disc 24 has been moved towards the axis of the needle cylinder thus exerting somewhat greater tension on the said thread to avoid any possibility of the said needle 171 displacing the thread T within the hook of the needle 172. The lowering of the thread T by the finger 137 causes such thread to be placed low on the needle latches of the wrap needles thus maintaining proper plating separation of the said plating wrap thread T and the yarn or yarns thereafter to be fed at the main knitting point by one or more of the yarn guides 5-9 inclusive. Cam 169 may be automatically withdrawn prior to the commencement of wrap knitting in any suitable manner and restored to an active position prior to the knitting of heels and toes or other reciprocatory knitting.

Figure 19:
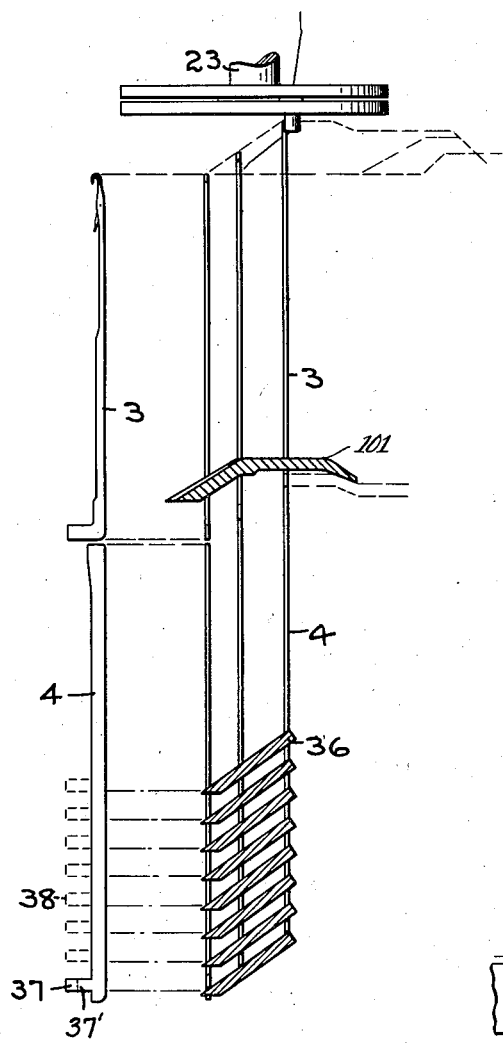
Fig. 19 is an elevational view showing the timing of the needle movements to ensure perfect plating in the wrap stripe areas.
Figure 21:
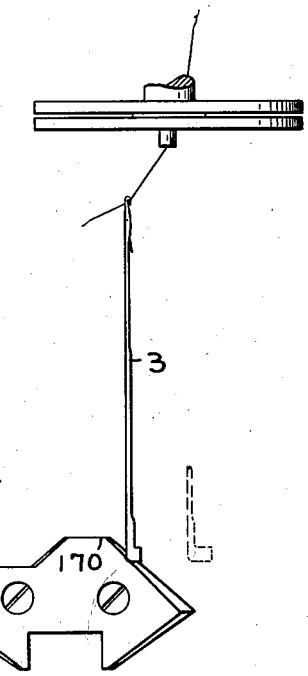
Fig. 21 is a detail view showing the timing of the needle raising and of the needle wrapping.

In Fig. 19, dotted line paths of the tops of the needles are indicated. The dotted line path beginning at the left of Fig. 19 indicates the path of the tops of the needles about which thread T is wrapped; the path immediately to the right of the end-most needle of Fig. 19 indicates the path normally taken by the tops of the needles when the cam 169 is in a forward position; and the path shown by the dotted lines at the right of Fig. 19 indicates the travel of the tops of the needles when the cam 169 is in the retracted position shown in Fig. 22 and the cam 170 effects the latch clearing movement of the needles.

Figure 22:
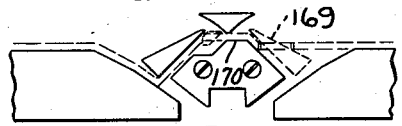
Fig. 22 is a fragmentary elevational view showing the latch clearing movements of the needles occurring at a later phase of the knitting cycle than normally.
Figure 30:
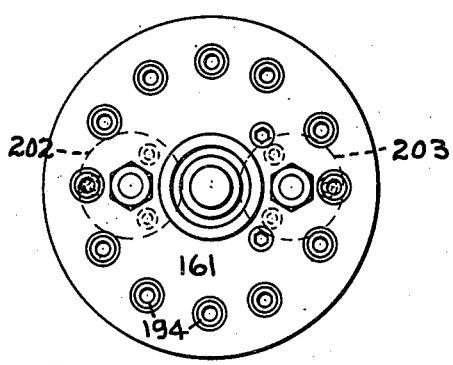
Fig. 30 is a plan view of a wrapping head.
Figure 32:
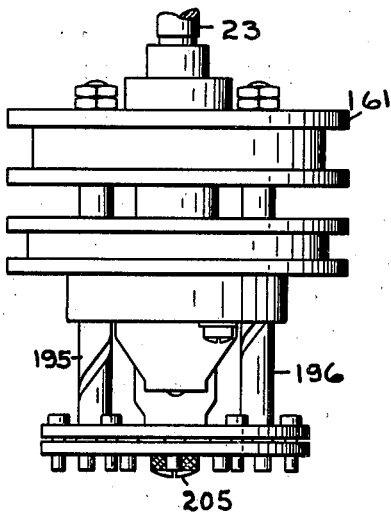
Fig. 32 is a view similar to Fig. 31 but showing the parts in another relative position to permit the wrapping of selected needles with threads of another color.

In Figs. 23-27 inclusive, is shown additional mechanism which may be used in conjunction with the mechanisms hereinbefore described. It sometimes happens that during the knitting of wrap or other loops and especially so when wrapping single needles, that such a needle, around which is tightly wrapped a thread, upon being elevated subsequently to knitting or drawing a stitch, will raise such drawn loops indicated at 173, Fig. 27, above the nib 174 of a sinker 175. This is especially true when knitting tight loops and where, as illustrated in Fig. 22, the cam 169 is retracted. When the cam 169 is in an advanced position, the needles are elevated to clear their loops, i. e., to cause the loops to drop below the needle latches, while the regular sinker cam which is shown beneath flopper cam 176, is acting upon the sinkers to hold them in a relatively forward position; however, when the cam 169 is in the retracted position shown in Fig. 22, the needles are not elevated to clear their latches until they engage the cam 170 at which time the sinkers have passed beyond the influence of the regular sinker advancing cam, consequently the flopper cam 176 is maintained in a forward position by the cam 183 to prevent the loops moving up with the needles and above the sinker nibs. To overcome such objection the flopper cam 176 is provided such cam being pivoted in a sinker cap 177 at 178. A spring 179 attached to one arm of the lever 176 at 180 and at its other end to the sinker cap 177 at 181, serves to hold the other arm and cam face of the flopper cam 176 in engagement with stop 181' in the relatively retracted position shown in Fig. 24 where it remains during reciprocatory knitting; however, immediately prior to wrap knitting the sinker cap 177 is as usual moved in the direction of the arrow, Fig. 24, whereupon a pin 182 upstanding from the cam arm of the lever 176 moves along a fixed cam plate 183 such movement causing the cam portion of the lever 176 to be rocked inwardly to the position shown in Fig. 26. As will be understood the sinkers 175 are urged outwardly at the knitting point due to the tension of the forming fabric and unless restrained from such outward movements the objections heretofore noted are not overcome. In other words, the loops 173 may be elevated above the nib 174 of the sinkers 175. However, by means of the cam portion of the lever 176 the sinkers are maintained in their relatively forward position where their nibs 174 are sufficiently far advanced to prevent the loops 173 from being elevated above such nibs. The cam 183 is adjustably connected to a rod 184 by means of pin and slot connection 185. The rod 184 is rigidly connected as by screws 186 to yarn lever box 30.

In Figs. 28, 29, 29a there is shown mechanism somewhat modified with respect to that disclosed in Fig. 19 for elevating the jacks by engaging the upper jack butts 38 at two circumferentially spaced points whereby so-called color within color work may be knitted. In cooperation with the cam means disclosed specifically in Figs. 28 and 29 there may be used a modified form of wrapping head such as disclosed in Figs. 36-39 inclusive, to be hereinafter more specifically described. The sectional view of Fig. 29 shows a pair of jack cams 187 and 188 there being as many sets of these jack cams as there are cam rows 26 on the drum 25. As shown in Fig. 29, the cams 187, 188 are connected to move together by means of a link 189 and the cam 188 is slotted as indicated at 190 within which slot a pin 191 fits, the said pin depending from an arm of a lever 32, the construction, mounting and control of which has hereinbefore been described. Whenever a lever such as 32 is rocked by its companion lever 27 the cams 187 and 188 are withdrawn, the amount of withdrawal depending upon the heights of the cam 26 and the lengths of the butts 38, the arrangement of different length butts 38 and different height cams 26 being dependent upon the fabric design to be knitted. The cams 187, 188 are slidably mounted in a bracket 192 upstanding from and connected to the circular base 15 in any suitable manner. The cams 187, 188 elevate the butts 38 and consequently their companion needles at two points spaced circumferentially of the needle circle.

In the foregoing description there has been disclosed mechanism for controlling the knitting operations incidental to the knitting of wrap stripe fabric. In conjunction with such mechanism a wrap stripe disc such as 24 may be employed in which case the eyelets in such discs may always feed to the same needles or the said disc 24 may be oscillated to effect the wrapping of certain needles with certain yarns from course to course or as desired.

In Figs. 30-34 inclusive, there is shown a wrap head indicated generally by the numeral 193 which is mounted upon the shaft 23 to turn therewith and, preferably, one and one with the needle cylinder 2. The sleeve 161 is made fast to the said shaft 23 and is provided with eyelets such as 194 for the passage of the wrap threads to the needles of the knitting machine. Also passing downwardly through the said sleeve 161 are shafts 195 and 196, said shafts having spiral grooves 197, 198 therein which are adapted to be engaged by the tips of cams 199, 200 which are adjustably fastened to the underside of a vertically movable disc or sleeve 201 to which vertical movements are imparted by means of a lever 201' the rocking movements of which are governed in much the same manner as are the movements of lever 47 shown in Fig. 2 of the Patent (Great Britain) No. 367,796, cams of two heights being substituted for the cams 14 shown in said Patent No. 367,796. The engagement of the spiral grooves 197, 198 by their respective cams 199, 200 causes the shafts 195, 196 to be rotated when the disc 201 is moved to and from the position shown in Figs. 31, 32 and 33. The shafts 195, 196 have connected thereto respectively supplemental discs 202, 203 which are rotatable in recesses provided in a disc 204 which is connected to rotate with the shaft 23 as by means of a screw 205. Each disc 202, 203 is provided with three eyelets 108 (Figs. 14 and 30), one of which is in feeding position when the disc 201 is in the position shown in Fig. 31, another of which is in feeding position when the disc 201 is in the position shown in Fig. 32 and the third is in feeding position when the disc is in the position shown in Fig. 33.

Whichever ones of the eyelets 108 are disposed adjacent to the outer periphery of the disc 204, the threads passing through such eyelets are wrapped around selected needles in a manner similar to that disclosed in Lawson Patent 1,702,608.

In Figs. 35–38 inclusive is shown a modified form of wrapping head indicated generally by the numeral 206. The shaft 23 or extension thereof has connected thereto for rotary movements therewith a sleeve or disc 207 which is provided with a depending hub portion 208, the latter having a diagonal slot 209 within which slides a pin 210. Pin 210 is connected to a hub 211 to which a wrap disc 212 is attached, the latter having adjustably secured adjacent to its periphery a series of short eyelets 213 interspersed among which are a series of longer eyelets 214, all of said eyelets being mounted upon plates 215 having an adjustable pin and slot connection 216 with the disc 212. The adjustable connection provides a radial as well as a lateral movement of the eyelets 213, 214. The disc 207 is movable to and from the positions shown in Figs. 36 and 37, the said eyelets 213 when moved to the position shown in Fig. 37, occupying the position of the eyelets 214, Fig. 36, and likewise the eyelets 214 in Fig. 37, occupying the position of the eyelets 213, Fig. 36. Irrespective of the position occupied by the disc 207, the wrap disc 212 is fixed with respect to the shaft 23 and consequently turns one and one therewith and with the needle cylinder 2. The disc 207 is permitted to slide lengthwise of an extension of the shaft 23 and is prevented from circumferential movements with respect thereto by means of a key 217 fitted within a longitudinally disposed keyway 218.

As hereinbefore described, the cams 187, 188, Fig. 29, elevate their jacks at two circumferentially spaced points of the needle cylinder and consequently raise the needles companion to the jacks at such spaced points, such cams 187, 188 being especially adapted to cooperate with the eyelets 213, 214 depending from the disc 212. In practicing this form of the invention the cams 187 elevate their jacks and consequently their needles to such a position as to be wrapped by a thread passing through the long eyelets 214, the said thread also passing around the shanks but below the latches of the needles elevated by the cams 188. The latter cams elevate their jacks and consequently their needles to such a position as to permit the threads passing through the short eyelets 213 to be received in the hooks of the said needles, the said threads, however, passing above the hooks of the needles first mentioned.

Figure 39:
Fig. 39 is a detail fragmentary view of a still further modification showing three adjacent guides each adapted to wrap selected needles of a group of needles.
Figures 40, 41:
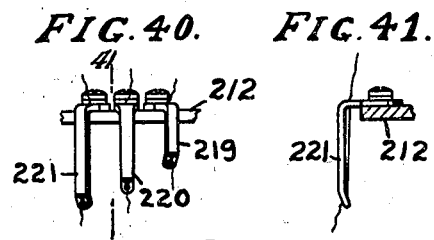
Fig. 40 is a fragmentary elevational view of the guides shown in Fig. 39.
Fig. 41 is a fragmentary elevational view taken along the line 41—41, Fig. 40.

In Figs. 39, 40 and 41 there is shown a modification wherein three threads which pass through eyelets 219, 220 and 221 are wrapped around three groups of needles which are selected by three sets of cams such as cams 187, 188. In practicing this modification of the invention, the needles to be wrapped by the thread passing through the long eyelet 221 are raised to a relatively low height; the needles to be wrapped by the thread passing through the eyelet 220 of intermediate length are raised to an intermediate height; and the needles to be wrapped by the thread passing through the eyelet 219 are raised to the highest position. Consequently, the thread passing through the eyelet 221 is fed into the hooks of its needles and below the latches of the other needles; the thread passing through the eyelet 220 is fed into the hooks of its needles and above the hooks of the needles pertaining to the eyelet 221 and below the latches of the needles pertaining to the needles 219; and the thread passing through the eyelet 219 is fed to the hooks of its needles and above the hooks of the other needles.

Figure 31:
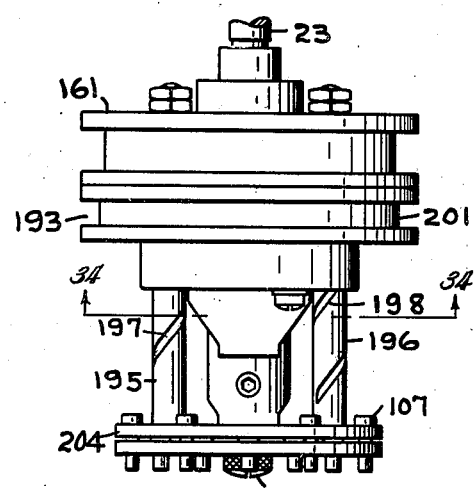
Fig. 31 is an elevational view of the wrapping head shown in Fig. 30, the parts being in such a position as to wrap selected needles with threads of one color.
Figure 33:
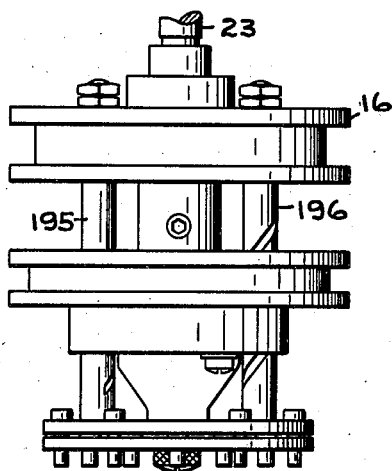
Fig. 33 is similar to Figs. 31 and 32 but showing the parts in still another position to permit the wrapping of selected needles with threads of a third color.
Figure 34:
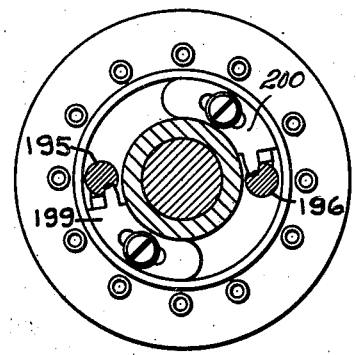
Fig. 34 is a sectional view taken along the line 34—34, Fig. 31.

Movement of the disc 201 to the position shown in Fig. 31 and consequent rotations of the shafts 195, 196, cause one of the three eyelets in each of the supplemental discs 202, 203 to be forwardly positioned so that upon rotations of the disc 204 one and one with the needle cylinder, such forwardly positioned eyelets will cause the threads passing through them to be wrapped around selected needles. When the disc 201 is moved from the position shown in Fig. 31 to that shown in Fig. 32 the shafts 195, 196 are rotated to cause a second eyelet in each supplemental disc 202, 203 to be forwardly positioned to wrap its thread around selected needles; and when the disc 201 is moved to the position shown in Fig. 33, the third eyelets in the discs 202, 203 are forwardly positioned to cause their threads to be wrapped around selected needles.

Figure 36:
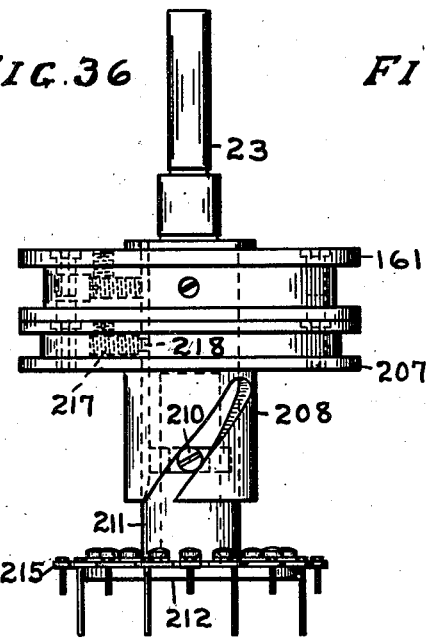
Fig. 36 is an elevational view of the wrapping head shown in Fig. 35 with the parts in such a relative position as to wrap selected needles with certain threads.
Figure 35:
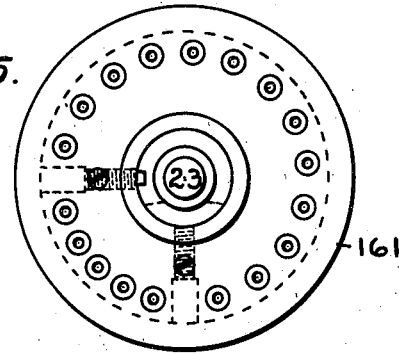
Fig. 35 is a plan view of a modified form of wrapping head.
Figure 38:
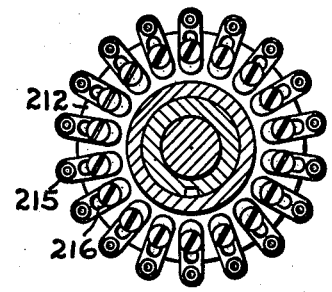
Fig. 38 is a view in section taken along the line 38—38, Fig. 37.
Figure 37:
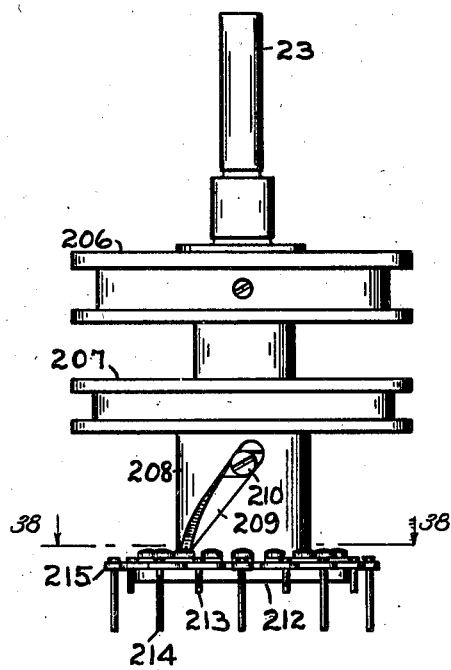
Fig. 37 is a view similar to Fig. 36 but showing the parts in another relative position to effect a contrasting wrapping of the selected needles.

When the disc 207 is in the position shown in Fig. 36 two adjacent eyelets cause their threads to be wrapped around selected needles, and when the disc 207 is moved to the position shown in Fig. 37, the mentioned threads are wrapped around another group of needles adjacent to the group first mentioned.

In Figs. 39, 40 and 41 are shown three eyelets of different lengths which wrap their respective threads around selectively raised needles in a manner hereinbefore described, and if the disc 212 is mounted in a manner similar to the disc 212, Fig. 36, movement of such disc as from the position shown in Fig. 36 to that shown in Fig. 37, causes the eyelets 219, 220, 221 to be moved circumferentially to such an extent as to cause threads passing through the said eyelets to be wrapped around another group of needles adjacent to the group theretofore wrapped.

Referring to Figs. 1, 5 and 14, there is shown a cutter 222 attached to the latch ring 13 adjacent to the mouthpiece thereof. This cutter serves as a convenient means for quickly severing yarns clamped when the knitting of the stocking is completed, the stocking being removed from the machine and the floats of the yarns thrown against the cutting edge of the cutter 222 and severed.

In the foregoing description the parts and combinations thereof have been specifically recited although it is not the intention to limit the invention otherwise than by the scope of the appended claims. Furthermore, while the particular type of knitting machine has been disclosed, obviously other types of knitting machines could have added thereto many of the improvements hereinbefore described. Latch needles have been disclosed although in more respects the invention is not limited to the use of latch needles.

We claim:

1. A knitting machine having a rotary needle cylinder, means for feeding at least one yarn to all the needles, means for clamping and severing withdrawn yarns, means for wrapping one or more threads around needles, and a finger for keeping the wrap threads out of the clamping and severing mechanism and from wrapping around supporting means therefor, and means for moving the finger away from the needle circle preparatory to reciprocatory knitting.

2. A latch ring, yarn guides movably mounted therein, an arcuate finger carried by the latch ring and positioned adjacent to the yarn guides, the arcuate finger being freely movable upwardly with respect to the yarn guides during knitting.

3. A latch ring, yarn guides movably mounted therein, an arcuate finger carried by the latch ring and being positioned adjacent to the yarn guides, the arcuate finger being freely movable inwardly with respect to the yarn guides during knitting.

4. A latch ring, yarn guides movably mounted therein, an arcuate finger carried by the latch ring and being positioned adjacent to the yarn guides, the arcuate finger being freely movable upwardly and inwardly with respect to the yarn guides during knitting.

5. A latch ring, yarn guides movably mounted in one portion thereof, a yarn clamping and severing mechanism carried by the latch ring, an element acting in conjunction with the clamping and severing mechanism for confining the movements of wrap threads, said element being positioned opposite the yarn guides and being freely movable upwardly with respect to the yarn guides during knitting.

6. A latch ring, guides movably mounted in one portion thereof, a yarn clamping and severing mechanism carried by the latch ring, an element acting in conjunction with the clamping and severing mechanism for confining the movements of warp threads, said element being positioned opposite the yarn guides and being freely movable inwardly with respect to the yarn guides during knitting.

7. A latch ring, guides movably mounted in one portion thereof, a yarn clamping and severing mechanism carried by the latch ring, an element acting in conjunction with the clamping and severing mechanism for confining the movements of wrap threads, said element being positioned opposite the yarn guides and being freely movable upwardly and inwardly with respect to the yarn guides during knitting.

8. A latch ring, yarn guides movably mounted in one portion thereof, a yarn clamping and severing mechanism carried by the latch ring, an element acting in conjunction with the clamping and severing mechanism for confining the movements of wrap threads, said element being positioned opposite the yarn guides and being movable upwardly with respect to the yarn guides, a cooperating thread confining finger movably mounted upon the thread clamping and severing mechanism, the upward movement of the element causing the finger to be moved.

9. A latch ring, guides movably mounted in one portion thereof, a yarn clamping and severing mechanism carried by the latch ring, an element acting in conjunction with the clamping and severing mechanism for confining the movements of wrap threads, said element being positioned opposite the yarn guides and being movable inwardly with respect to the yarn guides, a cooperating thread confining finger movably mounted upon the thread clamping and severing mechanism, movement of the element causing the finger to be moved.

10. A latch ring, guides movably mounted in one portion thereof, a yarn clamping and severing mechanism carried by the latch ring, an element acting in conjunction with the clamping and severing mechanism for confining the movements of wrap threads, said element being positioned opposite the yarn guides and being movable upwardly and inwardly with respect to the yarn guides, a cooperating thread confining finger movably mounted upon the thread clamping and severing mechanism, the upward and inward movement of the element causing the finger to be moved.

11. A latch ring, guides movably mounted therein, a thread confining finger positioned interiorly of the latch ring and being freely movable towards the center thereof during knitting, and means for adjustably mounting the finger on the latch ring to permit the finger to be adjusted with respect to the needle circle.

12. A latch ring, guides movably mounted therein, and a thread confining finger positioned interiorly of the latch ring and movable toward the center thereof during knitting, means for movably mounting the finger on the latch ring said means including a movable support and a bracket carried by the latch ring through which bracket the supporting means for the finger passes, the construction being such that when the said support is moved independently of the bracket with relation to the bracket the finger is moved inwardly with respect to the needle circle.

13. A circular knitting machine, guides for feeding yarns to the needles thereof and means for wrapping threads around selected needles, in combination with clamping and severing mechanism for the yarns and means for confining the movements of the wrap threads, said means last mentioned including a freely movable finger positioned adjacent to the inside of the needle circle, and means for effecting movements of the finger away from the needle circle prior to reciprocatory knitting.

14. A circular knitting machine, guides for feeding yarns to the needles thereof and means for wrapping threads around selected needles, in combination with clamping and severing mechanism for the yarns and means for confining the movements of the wrap threads, said means last mentioned including a movable finger positioned adjacent to the inside of the needle circle, means for effecting movements of the finger away from the needle circle prior to reciprocatory knitting, said means last mentioned including a movable support for the finger, and automatically controlled means for effecting movements of the support.

15. A circular knitting machine having means for feeding yarns to the needles thereof and means for wrapping threads around selected needles, severing mechanism for withdrawn yarns in combination with means for confining movements of the wrap threads, said means including a finger normally positioned adjacent to the interior of the needle circle but movable away from the needles, means for imparting movements to the said finger including a support to which the said finger is connected, and means for engaging and moving the support to restore the finger to its first named position.

16. A circular knitting machine having a rotary needle cylinder and means for feeding yarns to the needles thereof, means for wrapping threads around selected needles, yarn clamping and severing means associated with the knitting machine and a thread confining finger associated with the yarn clamping and severing means to confine the movements of the wrap threads, means for moving the finger away from the circle of the needles preparatory to reciprocatory knitting and to restore the finger to its first position at the conclusion of reciprocatory knitting.

17. A latch ring for use in a circular knitting machine having eccentric thread wrapping mechanism, said latch ring having means for feeding yarns to the needles and a recess or gap to facilitate the wrapping of needles with supplemental threads, means for preventing the unintentional closing of needle latches as during reciprocatory knitting, said means including an arcuate bar pivoted to the latch ring and adapted to be swung from an inactive position to an active position across said recess where it forms a continuation of the latch ring at a position to prevent the closing of needle latches raised above others as during reciprocatory knitting.

18. A latch ring for use in a circular knitting machine having eccentric thread wrapping mechanism, said latch ring having means for feeding yarns to the needles, the latch ring being cut away to facilitate the wrapping of selected needles, an arcuate gap closing member movably supported in the latch ring and adapted to be moved to a position across the cut-away portion of the latch ring where it forms a continuation of the latch ring to prevent the closing of latches on relatively elevated needles.

19. A latch ring for use in a circular knitting machine having eccentric thread wrapping mechanism, said latch ring having means for feeding yarns to the needles and a continuous latch controlling portion that prevents the closing of the latches of normally positioned needles, the latch ring being partially recessed to facilitate the wrapping of selected needles, and an arcuate gap closing member pivoted to the latch ring and movable in a slot thereof across said recess to a position to form a continuous latch controlling portion for the latches of relatively elevated needles as during reciprocatory knitting.

20. A circular knitting machine having a rotary needle cylinder and means for feeding yarns to the needles thereof, means for wrapping threads around selected needles, yarn clamping and severing means associated with the knitting machine and a thread confining finger associated with the yarn clamping and severing means to confine the movements of the wrap threads, means for moving the finger away from the circle of the needles preparatory to reciprocatory knitting and to restore the finger to its first position at the conclusion of reciprocatory knitting, the finger restoring means including a lever having a movably mounted part thereon which engages a support for the finger when restoring the finger to its first position at the conclusion of reciprocatory knitting.

21. A circular, independent needle knitting machine having a rotary needle cylinder and means for wrapping a thread around a group of selected needles, and means acting upon the thread to deflect the same in its passage from the wrapping means to the last wale in which the said wrap thread is knitted in a preceding course of knitting so that the said wrap thread shall be knitted by the first needle of the group of needles during the knitting of a succeeding course of knitting, the deflection of the thread being in the direction of the rotary movements of the needle cylinder.

22. A knitting machine having means for clamping and severing withdrawn yarns and also having means mounted thereon consisting of two relatively adjustable elements for confining wrap threads and preventing their becoming entangled in the clamping and severing mechanism or wrapping around the support therefor.

23. A knitting machine having means for clamping and severing withdrawn yarns and also having means mounted thereon consisting of two relatively adjustable elements for confining wrap threads and preventing their becoming entangled in the clamping and severing mechanism or wrapping around the support therefor, one of the said relatively adjustable elements being of arcuate form and positioned adjacent to the interior of the needle circle.

24. A circular knitting machine having a latch ring and guides in the latch ring for feeding yarns to the needles of the knitting machine, eccentrically disposed means for wrapping threads around selected needles, said means when in operative position overlapping the latch ring, the latch ring being recessed to accommodate the wrapping means to facilitate needle wrapping, and means for closing the recess in the latch ring to prevent closing of the needle latches.

25. A circular knitting machine having a latch ring and guides in the latch ring for feeding yarns to the needles of the knitting machine, eccentrically disposed means for wrapping threads around selected needles, said means when in operative position overlapping the latch ring, the latch ring being recessed to accommodate the wrapping means to facilitate needle wrapping, and means including a movably mounted arcuate member for closing the recess in the latch ring to prevent closing of the needle latches.

26. In an independent needle knitting machine having sinkers and needles each independently mounted therein, cams for acting upon the needles and sinkers between which cams and the needles and sinkers there are relative movements so that the needles and sinkers are successively actuated by their respective cams, a sinker cam normally maintaining the sinkers in a forward position, a supplemental cam acting upon the sinkers after said sinkers are beyond the influence of the sinker cam first mentioned and for retaining the said sinkers in a forward position to prevent latch clearing movements of the needles causing previously drawn stitches moving with the needles and as a consequence thereof above the restraining influence of the sinkers companion to the needles.

27. In a circular independent needle knitting machine having sinkers and needles each independently mounted therein, cams for acting upon the needles and sinkers between which cams and the needles and sinkers there are relative movements so that the needles and sinkers are successively actuated by their respective cams, one of the cams acting upon the needles being movable to an inactive position during the knitting of wrap courses thus delaying the latch clearing movements of the needles, a sinker cam normally maintaining the sinkers in a forward position, a supplemental cam acting upon the sinkers after said sinkers are beyond the influence of the sinker cam first mentioned and for retaining the said sinker in a forward position to prevent the delayed latch clearing movements of the needles causing previously drawn stitches moving with the needles and as a consequence thereof above the restraining influence of the sinkers companion to the needles.

28. In an independent needle knitting machine having sinkers and needles each independently mounted therein, cams for acting upon the needles and sinkers between which cams and the needles and sinkers there are relative movements so that the needles and sinkers are successively actuated by their respective cams, a sinker cam normally maintaining the sinkers in a forward position, a supplemental movable cam acting upon the sinkers after said sinkers are beyond the influence of the sinker cam first mentioned and for retaining the said sinker in a forward position to prevent latch clearing movements of the needles causing previously drawn stitches moving with the needles and as a consequence thereof above the restraining influence of the sinkers companion to the needles, and means for moving the supplemental cam to act upon the sinkers.

29. In a circular independent needle knitting machine having sinkers and needles each independently mounted therein, cams for acting upon the needles and sinkers between which cams and the needles and sinkers there are relative movements so that the needles and sinkers are successively actuated by their respective cams, one of the cams acting upon the needles being movable to an inactive position during the knitting of wrap courses thus delaying the latch clearing movements of the needles, a sinker cam normally maintaining the sinkers in a forward position, a supplemental movable cam acting upon the sinkers after said sinkers are beyond the influence of the sinker cam first mentioned and for retaining the said sinkers in a forward position to prevent the delayed latch clearing movements of the needles causing previously drawn stitches moving with the needles and as a consequence thereof above the restraining influence of the sinkers companion to the needles and means for moving the supplemental cam to act upon the sinkers.

30. A knitting machine having independent needles and means for feeding a main yarn to all the needles and a wrap thread to selected needles, means independent of the wrap thread feeding means for acting directly upon the thread to lower the same with respect to the needles to maintain proper plating separation between the said thread and yarn, and means for knitting the yarn and thread.

31. A spindle for needle wrapping mechanism for knitting machines, said spindle having a plate mounted therein for rotary movements, said plate having at least three eyelets through which eyelets wrap threads are adapted to pass, means for rotating the plate optionally to move any one of the eyelets so that a thread passing through the said eyelet may be wrapped around needles of a knitting machine.

32. A spindle for needle wrapping mechanism for knitting machines, said spindle having a plurality of plates mounted therein for rotary movements, said plates each having at least three eyelets through which eyelets wrap threads are adapted to pass, means for rotating the plates optionally to move any one of the eyelets so that a thread passing through the said eyelet in a plate may be wrapped around needles of a knitting machine.

33. A spindle for needle wrapping mechanism for knitting machines, said spindle having a plate mounted therein for rotary movements, said plate having a plurality of eyelets through which eyelets wrap threads are adapted to pass, means, including a shaft having spiral conformations and connected to the plate, for rotating the plate optionally to move any one of the eyelets so that a thread passing through the said eyelet may be wrapped around needles of a knitting machine, and means carried by the spindle for engaging the spiral conformations of the shaft for effecting rotary movements of the shaft.

34. A spindle for needle wrapping mechanism for knitting machines, said spindle having a plurality of plates mounted therein for rotary movements, said plates each having a plurality of eyelets through which eyelets wrap threads are adapted to pass, means, including a shaft having spiral conformations and connected to each plate, for rotating the plates optionally to move any one of the eyelets so that a thread passing through the said eyelet in a plate may be wrapped around needles of a knitting machine, and means carried by the spindle for engaging the spiral conformations of the shafts for effecting rotary movements of the shafts.

35. A spindle for needle wrapping mechanism for knitting machines, said spindle having a plate mounted therein for rotary movements, said plate having at least three eyelets through which eyelets wrap threads are adapted to pass, means, including a shaft having spiral conformations and connected to the plate, for rotating the plate optionally to move any one of the eyelets so that a thread passing through the said eyelet may be wrapped around needles of a knitting machine, and means carried by the spindle for engaging the spiral conformations of the shaft for effecting rotary movements of the shaft.

36. A spindle for needle wrapping mechanism for knitting machines, said spindle having a plurality of plates mounted therein for rotary movements, said plates each having at least three eyelets through which eyelets wrap threads are adapted to pass, means, including a shaft having spiral conformations and connected to each plate, for rotating the plates optionally to move any one of the eyelets so that a thread passing through the said eyelet in a plate may be wrapped around needles of a knitting machine, and means carried by the spindle for engaging the spiral conformations of the shafts for effecting rotary movements of the shafts.

37. A knitting machine having means for feeding a main yarn to all the needles, supplemental means for wrapping threads around selected needles, said wrapping means including a rotary spindle said rotary spindle including a rotary plate mounted for rotary movements in the spindle, said plate having eyelets by which threads are adapted to be passed around the selected needles, a shaft having spiral conformations and upstanding from the plate, in combination with automatically controlled means including an element movable lengthwise of the spindle for imparting rotary movements to the plate so that different threads may be wrapped around the selected needle, the rotary movements to the plates being effected by interengagement of the movable element and the spiral conformations of the shaft.

38. A circular, independent needle knitting machine having a rotary needle cylinder and means for wrapping threads around a group of selected needles and means acting upon the wrap threads to deflect each said thread in the direction of the rotary movements of the needles and to such a position that the first needle of the group shall engage a wrap thread during the knitting of each of a plurality of courses.

39. A circular, independent needle knitting machine having a rotary needle cylinder and means for wrapping threads around a group of selected needles and means acting upon the wrap threads to deflect each said thread in the direction of the rotary movements of the needles and to such a position that the first needle of the group shall engage a wrap thread during the knitting of each of a plurality of courses, said means including an adjustably mounted element, the adjustments being for the purpose of cooperating in the knitting of either wide or narrow stripes.

40. A circular, independent needle knitting machine having a rotary needle cylinder and means for clamping and severing withdrawn yarns, means for wrapping threads around a group of selected needles and means acting upon the wrap threads to deflect each said thread in the direction of the rotary movements of the needles and to such a position that the first needle of the group shall engage a wrap thread during the knitting of each of a plurality of courses, said means last-mentioned also serving to confine the wrap threads.

41. A circular, independent needle knitting machine having a rotary needle cylinder and means for clamping and severing withdrawn yarns, means for wrapping threads around a group of selected needles and means acting upon the wrap threads to deflect each said thread in the direction of the rotary movements of the needles and to such a position that the first needle of the group shall engage a wrap thread during the knitting of each of a plurality of courses, said means including an adjustably mounted element, the adjustments being for the purpose of cooperating in the knitting of either wide or narrow stripes, said means last-mentioned also serving to confine the wrap threads.

42. A circular, independent needle knitting machine including a latch ring having yarn guides movably mounted therein for feeding yarns to the needles and having a recess to facilitate needle wrapping in which recess threads may be wrapped around selected needles, a wrapping mechanism eccentrically disposed with respect to the needle circle, a fixed arcuate bar forming part of the latch ring and serving to prevent the closing of the latches of normally positioned needles, a supplemental arcuate bar which remains retracted during the knitting of wrap stripes but is movable to a gap closing position in the recess during reciprocatory or other knitting when some of the needles are elevated above others.

43. A circular, independent needle knitting machine including a latch ring having means for feeding yarns to the needles and being recessed adjacent thereto to facilitate the wrapping of selected needles, a wrapping mechanism eccentrically disposed with respect to the needle circle, the latch ring being constructed so as to prevent the unintentional closing of latches of normally positioned needles, and supplemental means adapted to move across the recess at such a position as to prevent the closing of the latches of needles positioned above normally positioned needles as during reciprocatory knitting.

ROBERT H. LAWSON.
ISAAC H. C. GREEN.

Disclaimer 2,146,750.—*Robert H. Lawson*, Pawtucket, and *Isaac H. C. Green*, Central Falls, R. I. KNITTING MACHINE. Patent dated Feb. 14, 1939. Disclaimer filed May 2, 1950, by the assignee, *Hemphill Company*.

Hereby enters this disclaimer to claims 17, 18, 19, 24, 25, 31 to 37 inclusive, and claims 42 and 43 of said patent.

[*Official Gazette June 13, 1950.*]